(12) United States Patent
Zhong et al.

(10) Patent No.: US 12,212,447 B2
(45) Date of Patent: Jan. 28, 2025

(54) METHOD AND APPARATUS FOR DETECTION OF RADIO SIGNAL

(71) Applicant: Telefonaktiebolaget LM Ericsson (publ), Stockholm (SE)

(72) Inventors: Ke Zhong, Beijing (CN); Mikhail Ivanov, Älvsjö (SE); Mattias Hyll, Vendelsö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/036,980

(22) PCT Filed: Nov. 20, 2020

(86) PCT No.: PCT/CN2020/130558
§ 371 (c)(1),
(2) Date: May 15, 2023

(87) PCT Pub. No.: WO2022/104725
PCT Pub. Date: May 27, 2022

(65) Prior Publication Data
US 2023/0421424 A1 Dec. 28, 2023

(51) Int. Cl.
*H04L 27/26* (2006.01)
*H04L 25/03* (2006.01)
*H04W 74/0833* (2024.01)

(52) U.S. Cl.
CPC .... *H04L 27/2634* (2013.01); *H04L 25/03993* (2013.01); *H04W 74/0833* (2013.01)

(58) Field of Classification Search
CPC ........... H04L 27/2634; H04L 25/03993; H04L 27/2666; H04L 27/2672; H04L 27/2675; H04L 27/2663; H04W 74/0833
See application file for complete search history.

(56) References Cited

U.S. PATENT DOCUMENTS 4,633,426 A * 12/1986 Venier ................ H03H 17/0254
333/132
5,841,315 A * 11/1998 Shou ..................... H03H 11/04
375/E1.018

(Continued)

FOREIGN PATENT DOCUMENTS

| CN | 101877594 A | 11/2010 |
| CN | 102710264 A | 10/2012 |

(Continued)

OTHER PUBLICATIONS

Hua, Min , et al., "Analysis of the Frequency Offset Effect on Random Access Signals", IEEE Transactions on Communications, vol. 61. No. 11, Nov. 1-13, 2013.

(Continued)

*Primary Examiner* — Jean B Corrielus
(74) *Attorney, Agent, or Firm* — Murphy, Bilak & Homiller, PLLC

(57) ABSTRACT

Embodiments of the present disclosure provide methods and apparatus for detection of radio signal. A method performed by a reception apparatus may comprise: obtaining (S101) time domain samples of a radio signal; processing (S102) the time domain samples by a plurality of match filters respectively, to generate a plurality of filtered results of the time domain samples; classifying (S103) a filtered result of the plurality of filtered results by a classifier; discarding (S104) a filtered result classified as being not associated to the code sequence; and determining (S105) whether the code sequence is used in the radio signal, when a filtered result of the radio signal is classified as being associated to the code sequence. Some processing procedures may be avoided based on the classification result of the detected radio signal, and computational complexity may be reduced.

19 Claims, 22 Drawing Sheets

(56) References Cited

U.S. PATENT DOCUMENTS

| | | | | |
|---|---|---|---|---|
| 9,794,093 | B1 * | 10/2017 | Haman | H04L 5/0051 |
| 2004/0023693 | A1 * | 2/2004 | Okawa | H04W 36/12 |
| | | | | 455/562.1 |
| 2005/0117632 | A1 * | 6/2005 | Sun | H04B 1/7083 |
| | | | | 375/150 |
| 2015/0023447 | A1 * | 1/2015 | Kondo | H04L 25/4902 |
| | | | | 375/295 |
| 2015/0215968 | A1 | 7/2015 | Jiang et al. | |

FOREIGN PATENT DOCUMENTS

| | | | | | |
|---|---|---|---|---|---|
| CN | 103297998 | A | | 9/2013 | |
| CN | 110139392 | A | | 8/2019 | |
| EP | 1057280 | B1 | * | 7/2003 | H04B 1/7075 |
| JP | 2013034204 | A | | 2/2013 | |

OTHER PUBLICATIONS

Sahlin, Henrik, et al., "Time-of-arrival estimation in Block-IFDMA systems for LTE in unlicensed spectrum", IEEE Wireless Communications and Networking Conference (WCNC), Jan. 5, 2017.

* cited by examiner

METHOD AND APPARATUS FOR DETECTION OF RADIO SIGNAL

TECHNICAL FIELD

The present disclosure relates generally to the technology of wireless communication, and in particular, to a method and an apparatus for detection of radio signal.

BACKGROUND

This section introduces aspects that may facilitate better understanding of the present disclosure. Accordingly, the statements of this section are to be read in this light and are not to be understood as admissions about what is in the prior art or what is not in the prior art.

In the communication system, a reception apparatus may obtain a radio signal, and then try to determine whether it is a valid radio signal from a transmission apparatus.

For example, a valid radio signal from a transmission apparatus may use one of predefined sequences. The reception apparatus may compare the obtained radio signal with all previously configured root sequences, to determine whether the obtained signal uses a sequence, and which exact sequence is possibly be used in the obtained signal.

Since in many scenarios, the reception apparatus continuously scans radio signals and make calculation/analyzation, such detection procedure leads to increased computational complexity and degraded false alarm performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Certain aspects of the present disclosure and their embodiments may provide solutions to these or other challenges. There are, proposed herein, various embodiments which address one or more of the issues disclosed herein. Improved methods and apparatuses are provided for detection of radio signal. For example, the detected radio signal may be classified, before performing at least part of the processing procedure of the detected radio signal with a previously configured root sequence. Some processing procedure may be avoided based on the classification result, and computational complexity may be reduced.

According to a first aspect of the present disclosure, there is provided a method performed by a reception apparatus. The method comprises obtaining time domain samples of a radio signal. The method further comprises processing the time domain samples by a plurality of match filters respectively, to generate a plurality of filtered results of the time domain samples. The plurality of the match filter may correspond to a plurality of code sequences respectively. The method further comprises classifying a filtered result of the plurality of filtered results by a classifier. A classifying result may indicate the filtered result being associated to a code sequence in the plurality of code sequences, or the filtered result being not associated to the code sequence in the plurality of code sequences. In an exemplary embodiment, the method further comprises discarding a filtered result classified as being not associated to the code sequence. In an exemplary embodiment, the method further comprises determining whether the code sequence is used in the radio signal, when a filtered result of the radio signal is classified as being associated to the code sequence.

In exemplary embodiments of the present disclosure, the method further comprises processing a filtered result classified as being associated to the code sequence, by peak search for the code sequence. Whether the code sequence is used in the radio signal may be determined, based at least on a result of the peak search.

In exemplary embodiments of the present disclosure, the classifier may comprise a machine learning (ML), classifier.

In exemplary embodiments of the present disclosure, the ML classifier may comprise a neural network (NN), classifier.

In exemplary embodiments of the present disclosure, the method further comprises processing each filtered result of the plurality of filtered results by non-coherent combining, before classifying.

In exemplary embodiments of the present disclosure, each filtered result may comprise data from a plurality of reception antennas. The data from a plurality of reception antennas may be non-coherently combined during the non-coherent combining.

In exemplary embodiments of the present disclosure, data from a reception antenna of the plurality of reception antennas may comprise a complex vector or matrix. The plurality of complex vectors or matrices corresponding to the plurality of reception antennas of a filtered result is non-coherently combined to a real vector or matrix, during the non-coherent combining.

In exemplary embodiments of the present disclosure, the real matrix may be classified, during classifying.

In exemplary embodiments of the present disclosure, a dimensionality reduction for the real vector or matrix may be performed during classifying.

In exemplary embodiments of the present disclosure, the dimensionality reduction may comprise a principal component analysis (PCA).

In exemplary embodiments of the present disclosure, the method further comprises processing the time domain samples by fast Fourier transform (FFT) before the plurality of match filters; and processing the plurality of filtered results by invert fast Fourier transform, IFFT, after the plurality of match filters.

In exemplary embodiments of the present disclosure, the method further comprises processing the time domain samples by pre-whitening, before the plurality of match filters.

In exemplary embodiments of the present disclosure, the method further comprises calculating a round trip time (RTT) relating to the radio signal, when the code sequence is determined to be used in the radio signal.

In exemplary embodiments of the present disclosure, the reception apparatus may comprise a base station.

In exemplary embodiments of the present disclosure, the plurality of code sequences may be configured root sequences for a physical random access channel (PRACH).

According to a second aspect of the present disclosure, there is provided a reception apparatus. The reception apparatus may comprise a processor, and a memory. The memory may contain instructions executable by the processor. The reception apparatus may be operative to obtain time domain samples of a radio signal. The reception apparatus may be further operative to process the time domain samples by a plurality of match filters respectively, to generate a plurality of filtered results of the time domain samples. The plurality of the match filter may correspond to a plurality of code sequences respectively. The reception apparatus may be further operative to classify a filtered result of the plurality of filtered results by a classifier. A classifying result may indicate the filtered result being associated to a code sequence in the plurality of code sequences, or the filtered result being not associated to the code sequence in the plurality of code sequences. The reception apparatus may be further operative to discard a filtered result classified as being not associated to the code sequence. The reception apparatus may be further operative to determine whether the code sequence is used in the radio signal, when a filtered result of the radio signal is classified as being associated to the code sequence.

In exemplary embodiments of the present disclosure, the reception apparatus may be further operative to perform the method according to any of embodiments described above.

According to a third aspect of the present disclosure, there is provided a computer-readable storage medium. The computer-readable storage medium stores instructions which when executed by at least one processor, cause the at least one processor to perform the method according to any one of embodiments described above.

According to a fourth aspect of the present disclosure, there is provided a reception apparatus. The reception apparatus may comprise an obtaining unit, configured to obtain time domain samples of a radio signal. The reception apparatus may further comprise a first processing unit, configured to process the time domain samples by a plurality of match filters respectively, to generate a plurality of filtered results of the time domain samples. The plurality of the match filter may correspond to a plurality of code sequences respectively. The reception apparatus may further comprise a classifying unit, configured to classify a filtered result of the plurality of filtered results by a classifier. A classifying result may indicate the filtered result being associated to a code sequence in the plurality of code sequences, or the filtered result being not associated to the code sequence in the plurality of code sequences. The reception apparatus may further comprise a discarding unit, configured to discard a filtered result classified as being not associated to the code sequence. The reception apparatus may further comprise a determining unit, configured to determine whether the code sequence is used in the radio signal, when a filtered result of the radio signal is classified as being associated to the code sequence.

In exemplary embodiments of the present disclosure, the reception apparatus is further operative to perform the method according to any of embodiments above mentioned.

Embodiments herein afford many advantages. For example, in embodiments herein, the detected radio signal may be classified, before performing at least part of the processing procedure of the detected radio signal with a previously configured root sequence. Some processing procedure may be avoided based on the classification result, and computational complexity may be reduced. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1A:
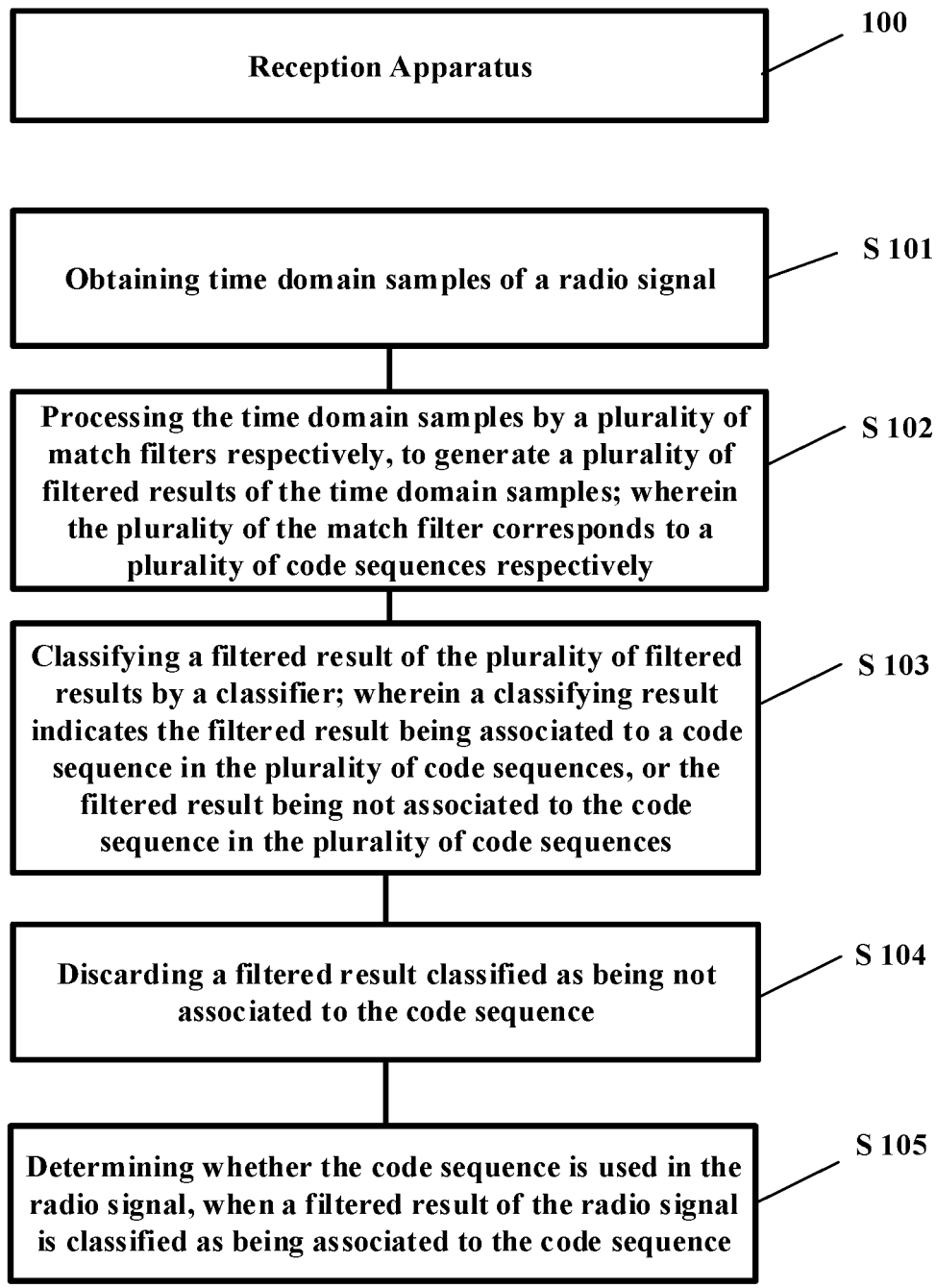
FIG. 1A is an exemplary flow chart showing a method performed at a reception apparatus, according to embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise $5^{th}$ generation (5G), new radio (NR), $4^{th}$ generation (4G), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "apparatus" used herein may refer to a network device or network entity or network function or any other devices (physical or virtual) in a communication network, namely, a network node/device. For example, the "apparatus" in the network may include a base station (B S), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the "apparatus" may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "apparatus" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), OAM (Operation Administration and Maintenance) etc. In other embodiments, the network function may comprise different types of NFs (such as PCRF (Policy and Charging Rules Function), etc.) for example depending on the specific network.

The term "apparatus" may further refer to any end device that can access a communication network and receive services therefrom, namely, a terminal device. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

In the communication system, a reception apparatus may obtain a radio signal, and then try to determine whether it is a valid radio signal from a transmission apparatus.

For example, there are several channels and signals in 4G/5G networks which are using predefined sequences (e.g. ZC (Zadoff-Chu) sequence, Gold sequence). Without limitation, one example is PRACH channel being used for initial connection to the network, another one is Demodulation Reference Signal, DMRS, for uplink, UL, channel estimation. Both of them are crucial for 4G/5G networks performance.

For PRACH detection, an implementation with parallel filtering allows optimal processing of sequences, but in some unexpected radio channel disturbances as frequency offset, external interference or fast UE moving there is still a room for optimization. The symptoms of the doppler may also cause an increased false alarm rate in different scenarios.

Furthermore, a peak search PRACH procedures for all configured root sequences may be needed in current implementation. This may lead to increased computational complexity and degraded false alarm performance.

The embodiments of the present disclosure may provide methods using ML algorithms, to make further optimization of detection of radio signals/channels.

FIG. 1A is an exemplary flow chart showing a method performed a reception apparatus, according to embodiments of the present disclosure.

As shown in FIG. 1A, the method may comprise: S101, obtaining time domain samples of a radio signal; S102, processing the time domain samples by a plurality of match filters respectively, to generate a plurality of filtered results of the time domain samples; wherein the plurality of the match filter corresponds to a plurality of code sequences respectively; S103, classifying a filtered result of the plurality of filtered results by a classifier; wherein a classifying result indicates the filtered result being associated to a code sequence in the plurality of code sequences, or the filtered result being not associated to the code sequence in the plurality of code sequences; S104, discarding a filtered result classified as being not associated to the code sequence; and S105, determining whether the code sequence is used in the radio signal, when a filtered result of the radio signal is classified as being associated to the code sequence.

According to embodiments of the present disclosure, the detected radio signal may be classified, before performing at least part of the processing procedure of the detected radio signal with a previously configured root sequence. Some processing procedure may be avoided based on the classification result, and computational complexity may be reduced.

When the code sequence is used in the radio signal, the radio signal may directly carry the code sequence, or the radio signal may be modulated using the code sequence.

Figure 1B:
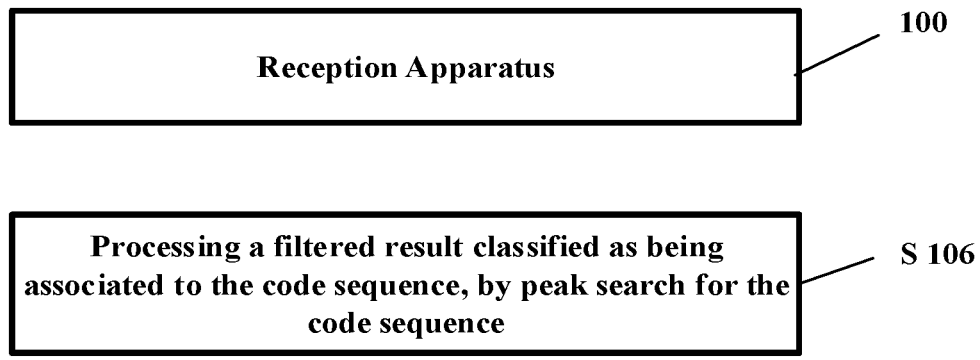
FIG. 1B is an exemplary flow chart showing additional steps of the method performed at the reception apparatus, according to embodiments of the present disclosure.

FIG. 1B is an exemplary flow chart showing additional steps of the method performed at the reception apparatus, according to embodiments of the present disclosure.

As shown in FIG. 1B, the method further comprises: S106, processing a filtered result classified as being associated to the code sequence, by peak search for the code sequence. Whether the code sequence is used in the radio signal is determined, based at least on a result of the peak search.

It should be understood that a determination about whether the code sequence is used in the radio signal, may be also based on any other kind of post-processing manners, alternatively or additionally to the peak search.

In embodiments of the present disclosure, the classifier comprises a machine learning, ML, classifier.

According to embodiments of the present disclosure, a ML classifier can be continuously trained and updated according to new samples, and thus the classification accuracy may be improved continuously.

In embodiments of the present disclosure, the ML classifier comprises a neural network, NN, classifier. It should be understood other kinds of ML classifier may also be utilized.

Figure 2:
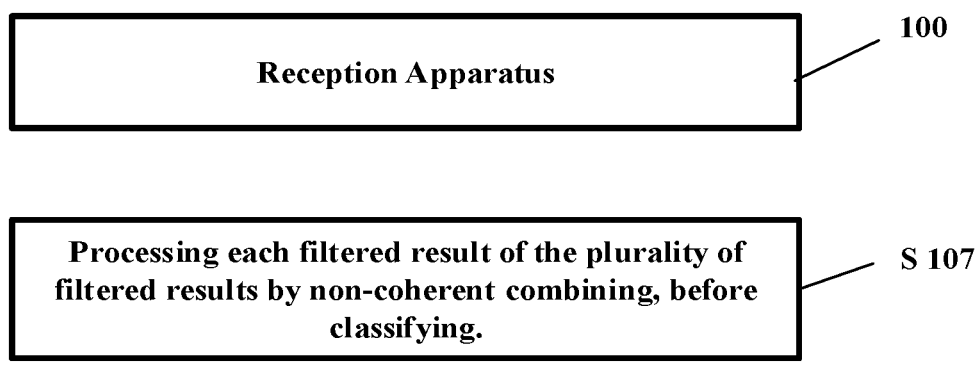
FIG. 2 is an exemplary flow chart showing additional steps of the method performed at the reception apparatus, according to embodiments of the present disclosure.

FIG. 2 is an exemplary flow chart showing additional steps of the method performed at the reception apparatus, according to embodiments of the present disclosure.

As shown in FIG. 2, the method further comprises: S107, processing each filtered result of the plurality of filtered results by non-coherent combining, before classifying.

In embodiments of the present disclosure, each filtered result comprises data from a plurality of reception antennas; and the data from a plurality of reception antennas is non-coherently combined during the non-coherent combining.

In embodiments of the present disclosure, data from a reception antenna of the plurality of reception antennas comprises a complex vector or matrix; a plurality of complex vectors or matrices corresponding to the plurality of reception antennas of a filtered result is non-coherently combined to a real vector or matrix, during the non-coherent combining.

In embodiments of the present disclosure, the real vector or matrix is classified, during classifying.

In implementation, a plurality of reception antennas may exist. Data from a reception antenna will be a complex vector in a sampling duration, and if data are aggregated from different sampling durations, they can become a complex matrix. Classifying a complex vector or matrix may introduce more complexity. Thus, in the embodiments of the present disclosure, a real vector or matrix after non-coherent combining will be classified, so as to further reduce complexity.

In embodiments of the present disclosure, a dimensionality reduction for the real vector or matrix is performed during classifying.

In embodiments of the present disclosure, the dimensionality reduction comprises a principal component analysis, PCA.

According to embodiments of the present disclosure, a dimensionality reduction, particularly a principal component analysis, may be utilized to further reduce the computation complexity.

Figure 3:
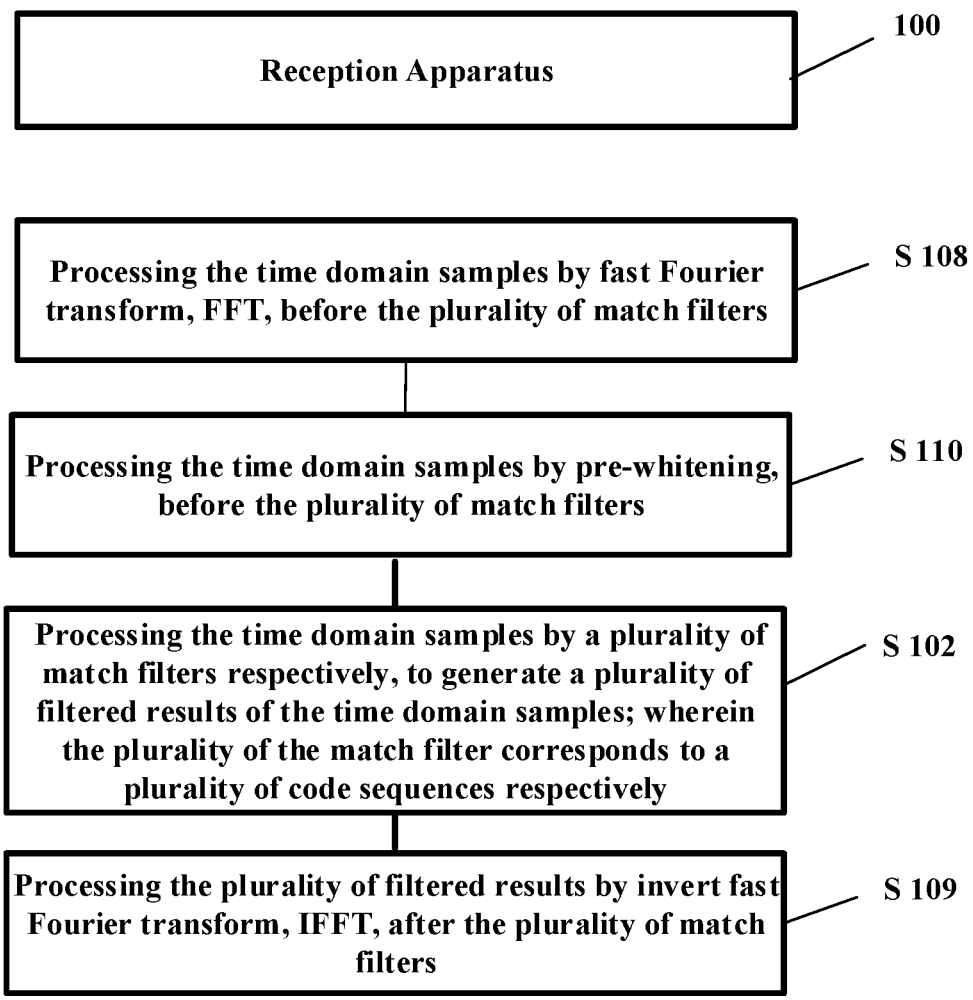
FIG. 3 is an exemplary flow chart showing additional steps of the method performed at the reception apparatus, according to embodiments of the present disclosure.

FIG. 3 is an exemplary flow chart showing additional steps of the method performed at the reception apparatus, according to embodiments of the present disclosure.

As shown in FIG. 3, the method further comprises: S108, processing the time domain samples by fast Fourier transform, FFT, before the plurality of match filters; and S109, processing the plurality of filtered results by invert fast Fourier transform, IFFT, after the plurality of match filters.

In embodiments of the present disclosure, the method further comprises: S110, processing the time domain samples by pre-whitening, before the plurality of match filters.

According to embodiments of the present disclosure, time domain samples may be transformed to frequency domain data by FFT, and then processed by pre-whitening, match filtering, etc. Then processed frequency domain data may be transformed to time domain data, by IFFT. Thus, in the method, appropriate processing manner/tool either in time domain or frequency domain may be utilized.

Figure 4:
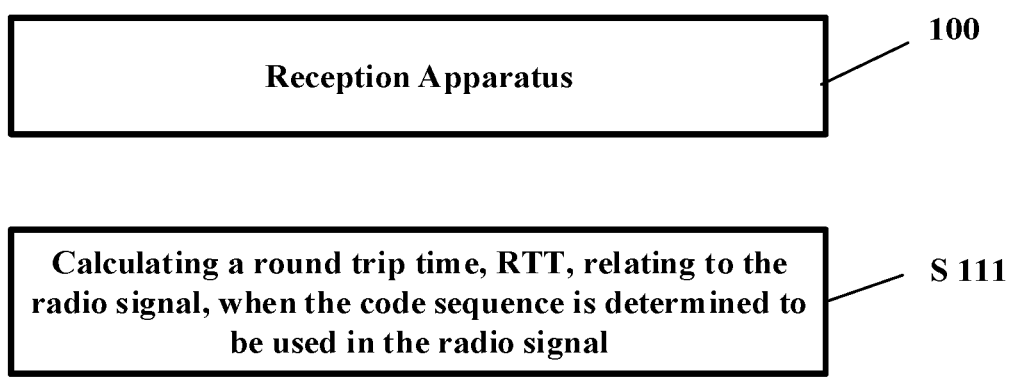
FIG. 4 is an exemplary flow chart showing additional steps of the method performed at the reception apparatus, according to embodiments of the present disclosure.

FIG. 4 is an exemplary flow chart showing additional steps of the method performed at the reception apparatus, according to embodiments of the present disclosure.

As shown in FIG. 4, the method further comprises: S111, calculating a round trip time, RTT, relating to the radio signal, when the code sequence is determined to be used in the radio signal.

According to embodiments of the present disclosure, any kind of post-processing, such as RRT calculation, for the radio signal may be further performed.

Still in the circumstance of the example of PRACH, in embodiments of the present disclosure, the plurality of code sequences is configured root sequences for a physical random access channel (PRACH).

In embodiments of the present disclosure, the reception apparatus comprises a base station, which try to detect PRACH signals from a terminal device.

According to embodiments of the present disclosure, the detected radio signal may be classified, before performing at least part of the processing procedure of the detected radio signal with a previously configured root sequence. Some processing procedure may be avoided based on the classification result, and computational complexity may be reduced.

Figure 5:
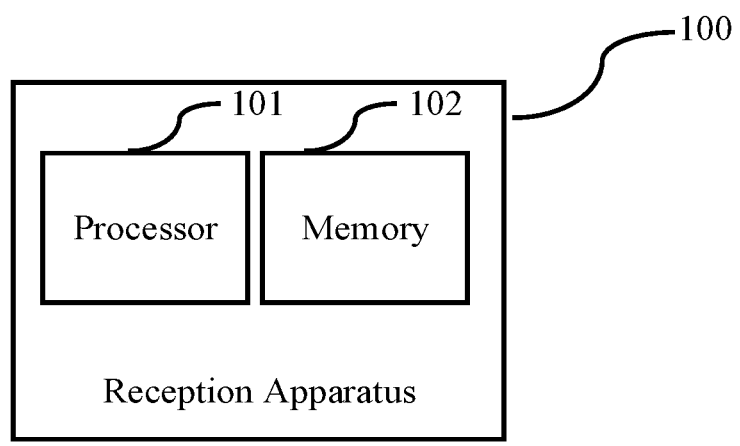
FIG. 5 is a block diagram showing exemplary apparatuses suitable for practicing the reception apparatus according to embodiments of the disclosure.

FIG. 5 is a block diagram showing exemplary apparatuses suitable for practicing the reception apparatus, according to embodiments of the disclosure.

As shown in FIG. 5, the reception apparatus 100 may comprise: a processor 101; and a memory 102. The memory 102 contains instructions executable by the processor 101, whereby the reception apparatus is operative to: obtain time domain samples of a radio signal; process the time domain samples by a plurality of match filters respectively, to generate a plurality of filtered results of the time domain samples; wherein the plurality of the match filter corresponds to a plurality of code sequences respectively; classify a filtered result of the plurality of filtered results by a classifier; wherein a classifying result indicates the filtered result being associated to a code sequence in the plurality of code sequences, or the filtered result being not associated to the code sequence in the plurality of code sequences; discard a filtered result classified as being not associated to the code sequence; and determine whether the code sequence is used in the radio signal, when a filtered result of the radio signal is classified as being associated to the code sequence.

Further, the reception apparatus 100 may be operative to perform the method according to any of the above embodiments, such as these shown in FIG. 1A-4.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 6:
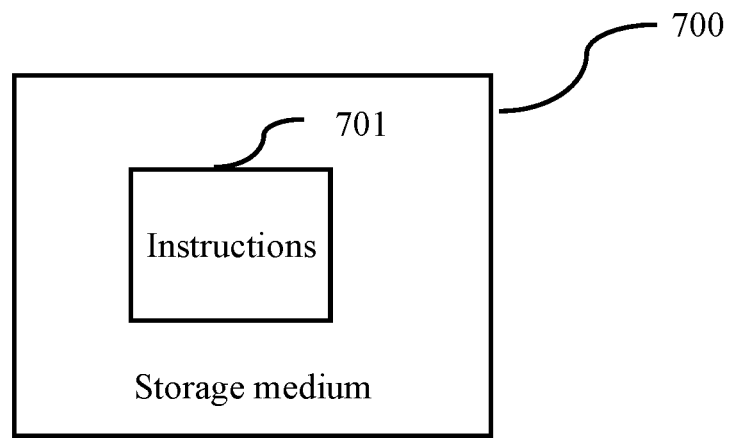
FIG. 6 is a block diagram showing an apparatus readable storage medium, according to embodiments of the present disclosure.

FIG. 6 is a block diagram showing an apparatus readable storage medium, according to embodiments of the present disclosure.

As shown in FIG. 6, the computer-readable storage medium 700, or any other kind of product, storing instructions 701 which when executed by at least one processor, cause the at least one processor to perform the method according to any one of the above embodiments, such as these shown in FIG. 1A-4.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 7:
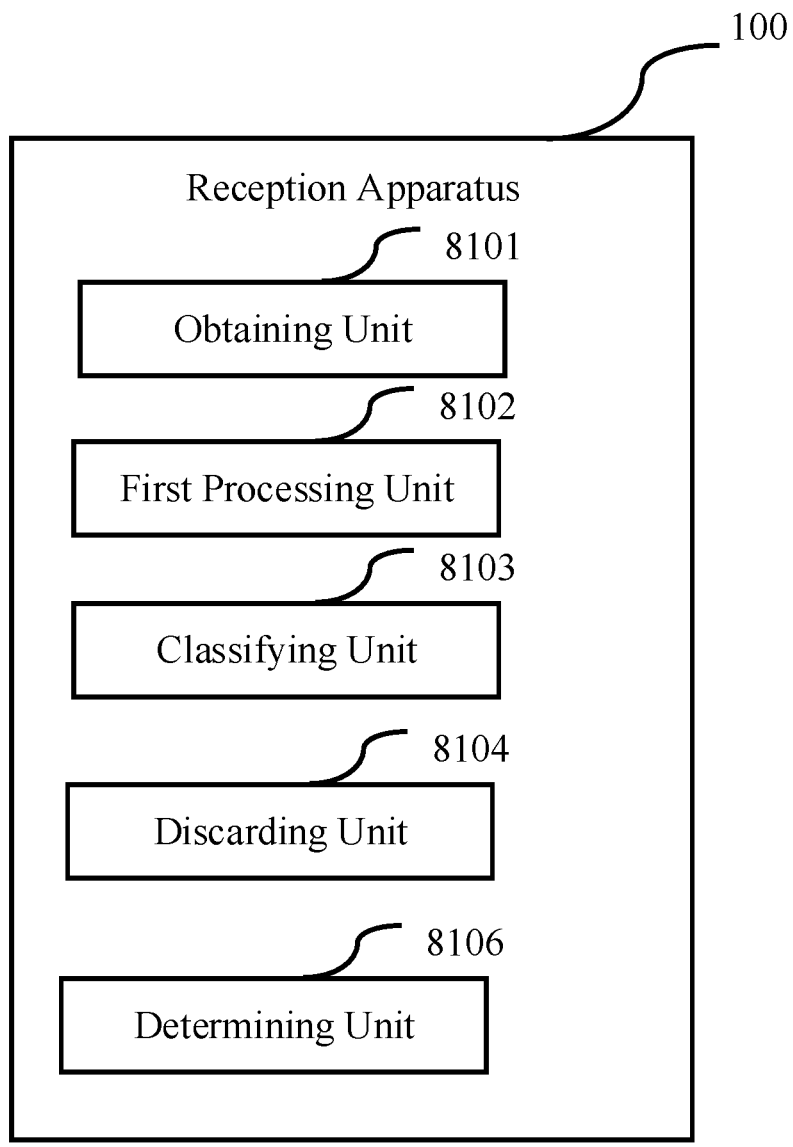
FIG. 7 is a schematic showing units for the reception apparatus, according to embodiments of the present disclosure.

FIG. 7 is a schematic showing units for the reception apparatus, according to embodiments of the present disclosure.

In embodiments of the present disclosure, the reception apparatus 100 may comprise: a obtaining unit 8101, configured to obtain time domain samples of a radio signal; a first processing unit 8102, configured to process the time domain samples by a plurality of match filters respectively, to generate a plurality of filtered results of the time domain samples; wherein the plurality of the match filter corresponds to a plurality of code sequences respectively; a classifying unit 8103, configured to classify a filtered result of the plurality of filtered results by a classifier; wherein a classifying result indicates the filtered result being associated to a code sequence in the plurality of code sequences, or the filtered result being not associated to the code sequence in the plurality of code sequences; a discarding unit 8104, configured to discard a filtered result classified as being not associated to the code sequence; and a determining unit 8105, configured to determine whether the code sequence is used in the radio signal, when a filtered result of the radio signal is classified as being associated to the code sequence.

In embodiments of the present disclosure, the terminal device is further operative to perform the method according to any of embodiments above described, such as shown in FIG. 1A-4.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the reception apparatus 100 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

Further detailed exemplary embodiments will be illustrated below, particularly the NN-based ML method will be utilized in the PRACH detection procedures.

Figure 8:
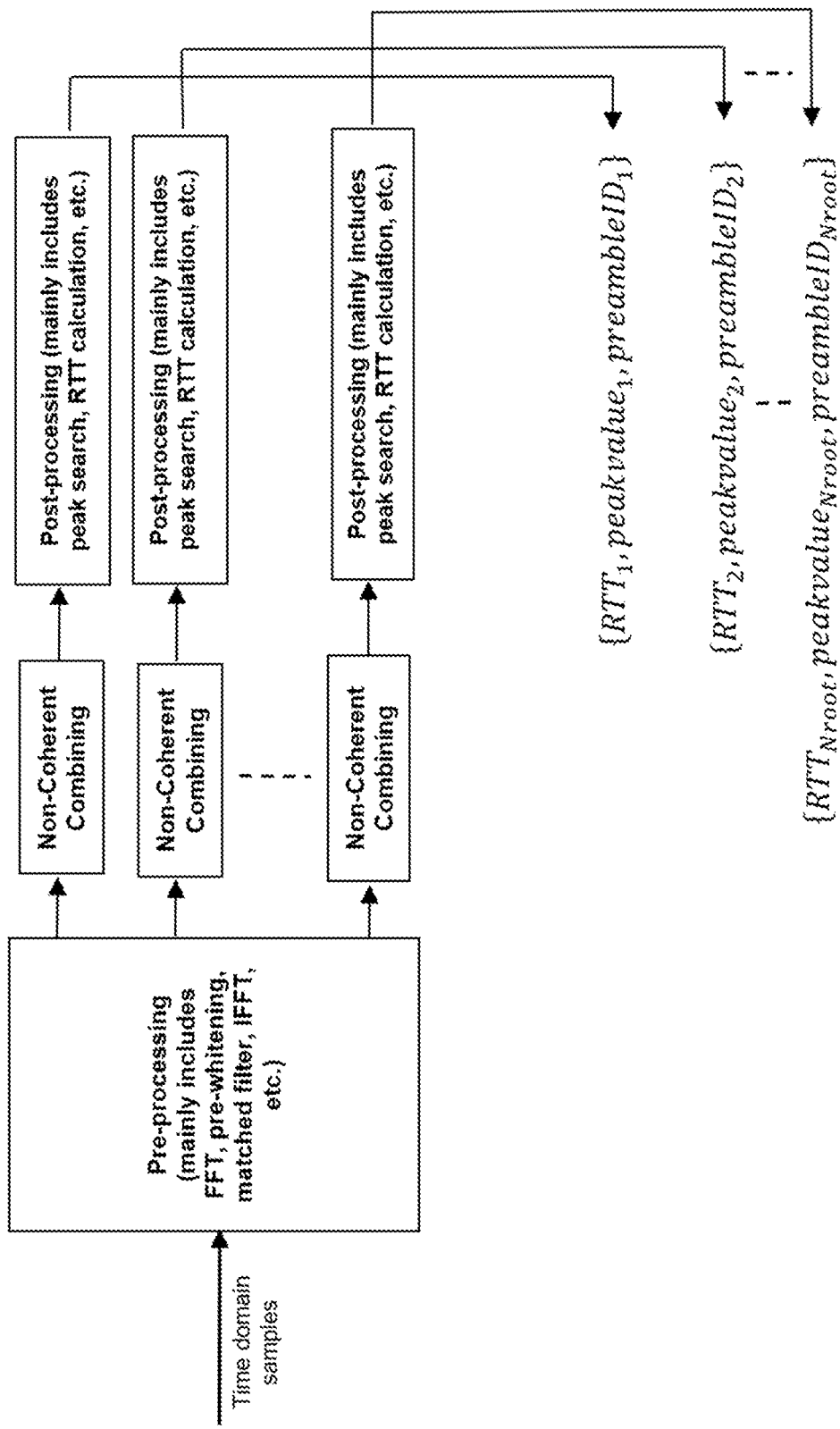
FIG. 8 is an exemplary diagram for a PRACH detection procedure without the NN-based ML method.

FIG. 8 is an exemplary diagram for a PRACH detection procedure without the NN-based ML method.

These procedures may be implemented at the BS side. As shown in FIG. 8, the exemplary PRACH detection process without NN-based ML method mainly comprises the following six steps:

Step 1: FFT (to transform the received PRACH signal from time domain to frequency domain);

Step 2: Pre-whitening filter (to pre-white the frequency domain received PRACH signal);

Step 3: Matched filter (to match filter the pre-whitened PRACH signal);

Step 4: IFFT (to transform the match filtered PRACH signal from frequency domain to time domain);

Step 5: Non-coherent combining signal is obtained by combining the matched filter output signals corresponding to different received signals from antennas into one combined output, per root sequence);

As an exemplary manner for non-coherent combining, firstly, the modulus of each element of complex vector/matrix is calculated, then the amplitude vectors/matrices for each complex vector/matrix is obtained based on the modulus, and then the amplitude vectors/matrices are accumulated and averaged to a non-coherent combined vector/matrix.

Step 6: Peak search and RTT estimation (to find the peak value and time-of-arrival estimation, based on the non-coherent combining signal).

Figure 9:
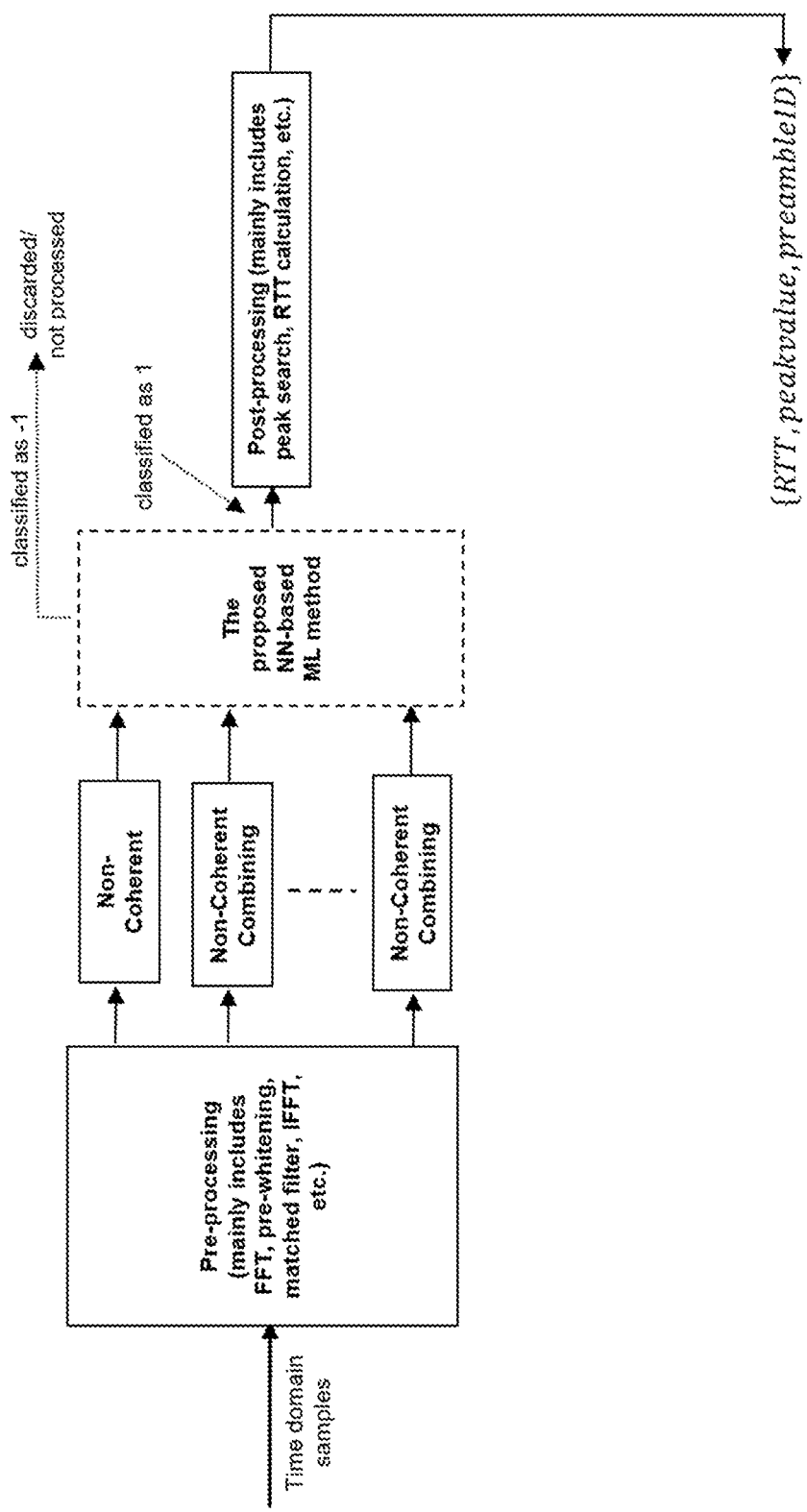
FIG. 9 is an exemplary diagram for a PRACH detection procedure with the NN-based ML method.

FIG. 9 is an exemplary diagram for a PRACH detection procedure with the NN-based ML method.

As shown in FIG. 9, the proposed ML-based PRACH detection process mainly comprises the following seven steps:

Step 1: FFT (to transform the received PRACH signal from time domain to frequency domain);

Step 2: Pre-whitening filter (to pre-white the frequency domain received PRACH signal);

Step 3: Matched filter (to match filter the pre-whitened PRACH signal);

Step 4: IFFT (to transform the match filtered PRACH signal from frequency domain to time domain);

Step 5: Non-coherent combining (the non-coherent combining signal is obtained by combining the matched filter output signals corresponding to different received signals from antennas into one combined output, per root sequence);

Step 6: The proposed ML-based classification for all non-coherent combining signals:

If the classification result is 1 for a non-coherent combining signal, go to Step 7;

If the classification result is −1 for a non-coherent combining signal, discard the non-coherent combining signal;

Step 7: Peak search and RTT estimation (to find the peak value and time-of-arrival estimation, based on the non-coherent combining signal).

In embodiments of the present disclosure, the supervised ML method Neural Network may be used, to select/classify the non-coherent combining signal with peak value, as shown in FIG. 9, and the computational complexity may be reduced and/or the detection performance may be improved.

Particularly, the non-coherent combining signal is classified. The non-coherent combining signal is obtained by combining the matched filter output signals corresponding to different received signals from antennas into one combined output, per root sequence. And this non-coherent combining signal is the only real-valued signal in PRACH detection process, and furthermore, it has peaks or no peaks that can be used as an obvious feature for feature extraction in ML method.

Some examples of non-coherent combining signal with peak (labeled as 1) and without peak (labeled as −1) are shown in FIG. 10-15.

Figure 10:
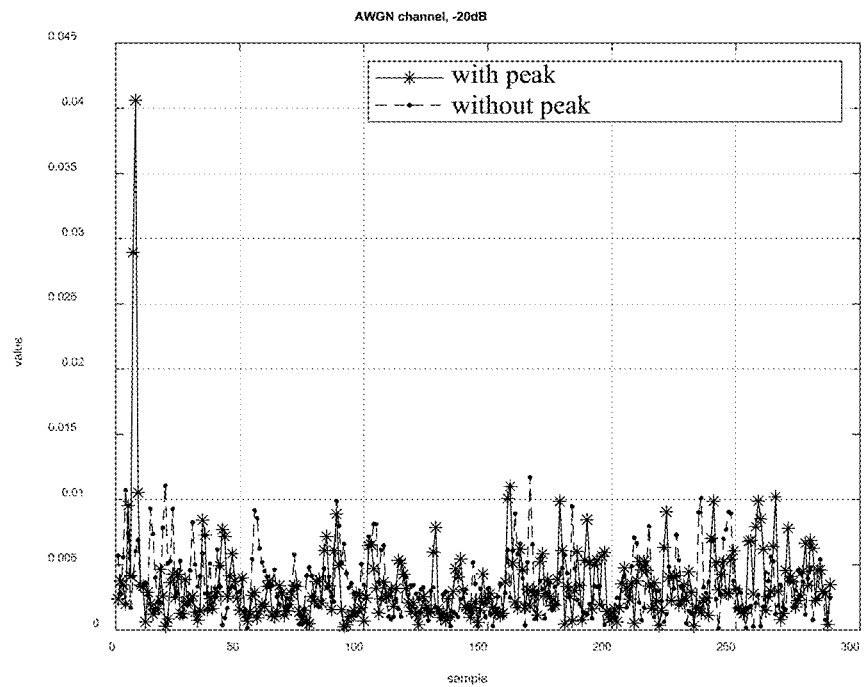
FIG. 10 is an exemplary diagram showing non-coherent combining signal with peak and without peak, Additive White Gaussian Noise (AWGN) channel, −20 dB.
Figure 11:
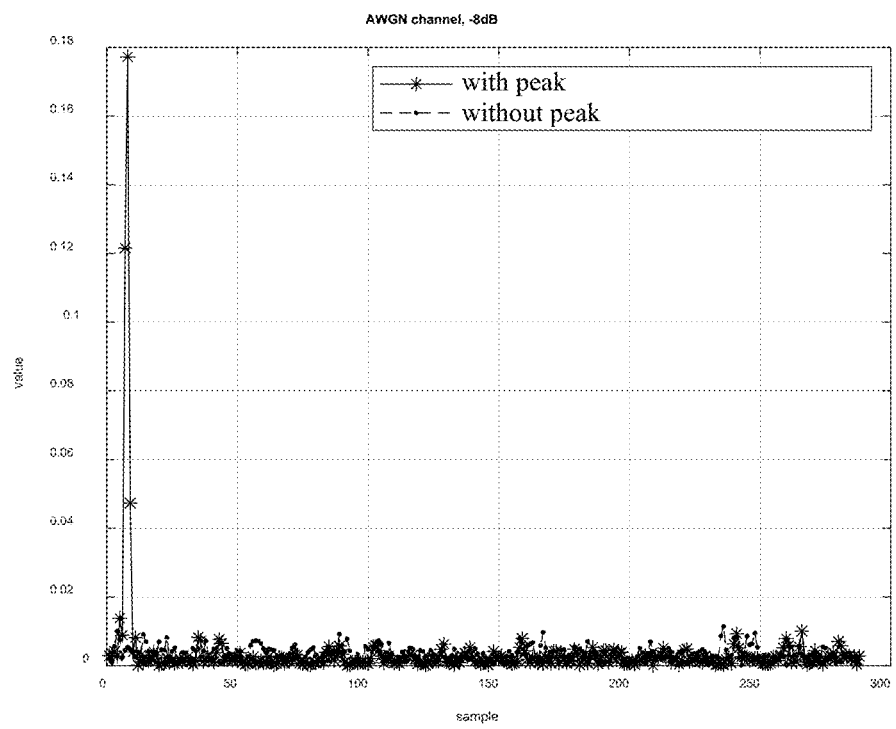
FIG. 11 is an exemplary diagram showing non-coherent combining signal with peak and without peak, AWGN channel, −8 dB.
Figure 12:
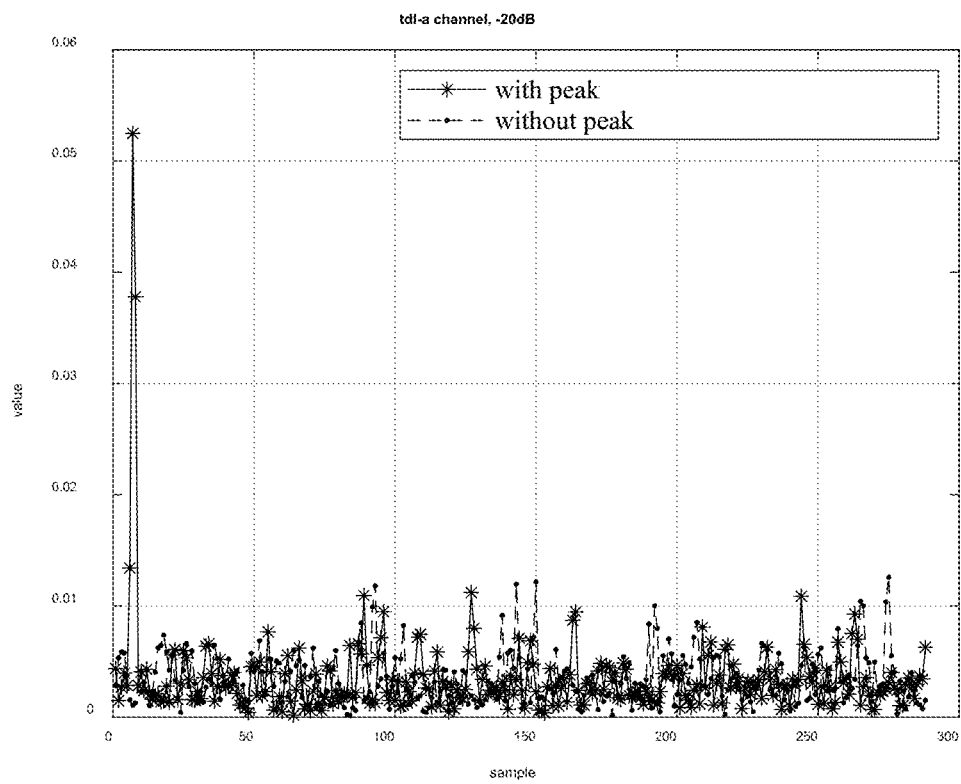
FIG. 12 is an exemplary diagram showing non-coherent combining signal with peak and without peak, tdl (Tapped Delay Line) -a channel, −20 dB.
Figure 13:
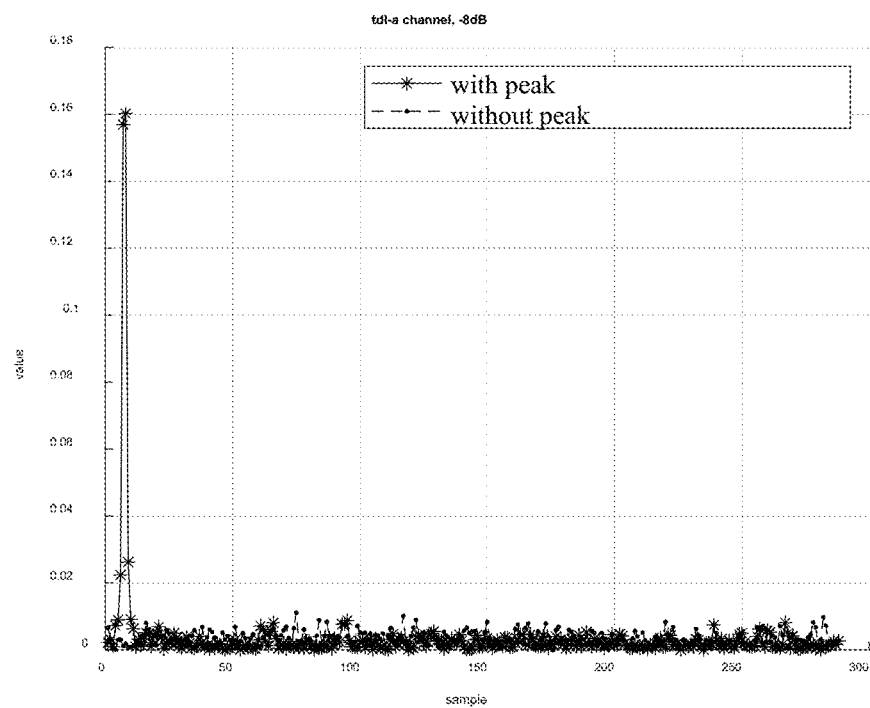
FIG. 13 is an exemplary diagram showing non-coherent combining signal with peak and without peak, tdl-a channel, −8 dB.
Figure 14:
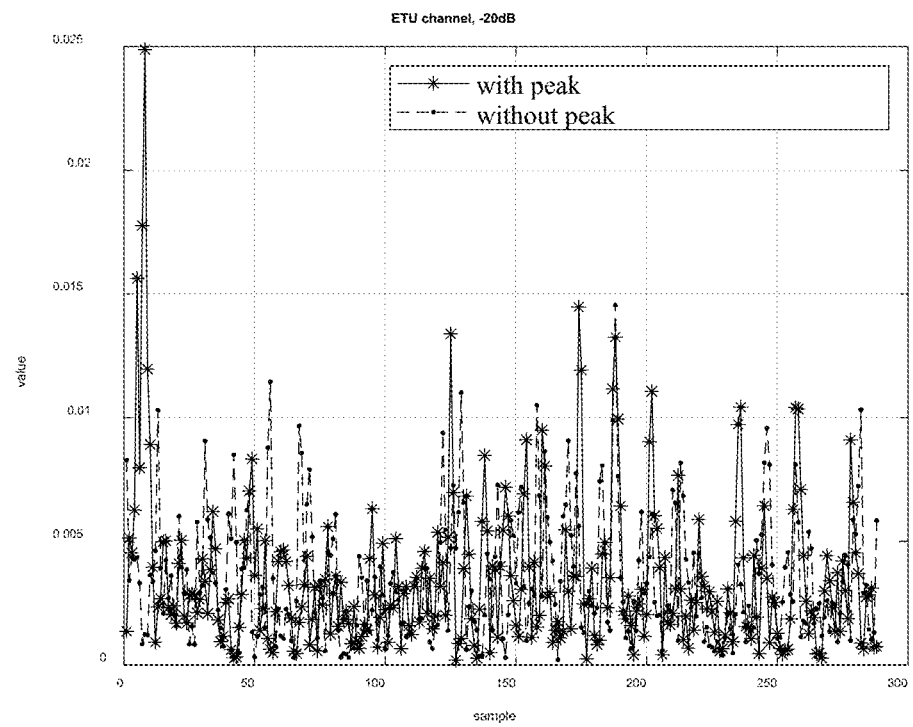
FIG. 14 is an exemplary diagram showing non-coherent combining signal with peak and without peak, ETU channel, −20 dB.
Figure 15:
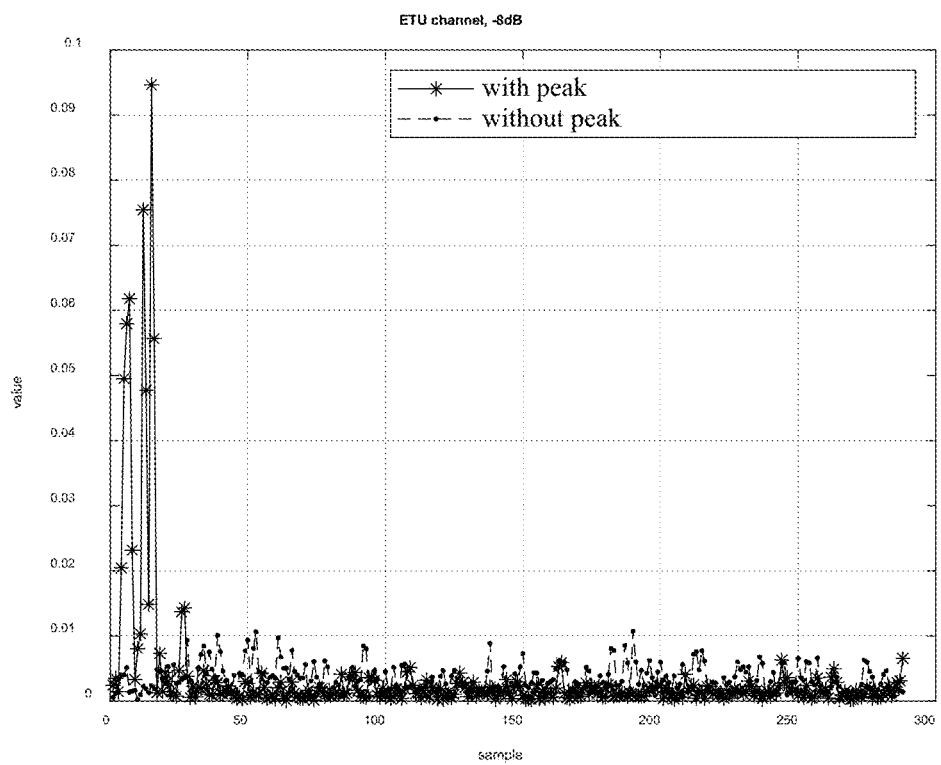
FIG. 15 is an exemplary diagram showing non-coherent combining signal with peak and without peak, ETU channel, −8 dB.

FIG. 10 is an exemplary diagram showing non-coherent combining signal with peak and without peak, AWGN channel, −20 dB. FIG. 11 is an exemplary diagram showing non-coherent combining signal with peak and without peak, AWGN channel, −8 dB. FIG. 12 is an exemplary diagram showing non-coherent combining signal with peak and without peak, tdl (Tapped Delay Line) −a channel, −20 dB. FIG. 13 is an exemplary diagram showing non-coherent combining signal with peak and without peak, tdl-a channel, −8 dB. FIG. 14 is an exemplary diagram showing non-coherent combining signal with peak and without peak, ETU channel, −20 dB. FIG. 15 is an exemplary diagram showing non-coherent combining signal with peak and without peak, ETU channel, −8 dB.

As shown in FIG. 10-15, the non-coherent combining signal with peaks or no peaks can be distinguished, in any kind of channel and/or any gain (dB).

Figure 16:
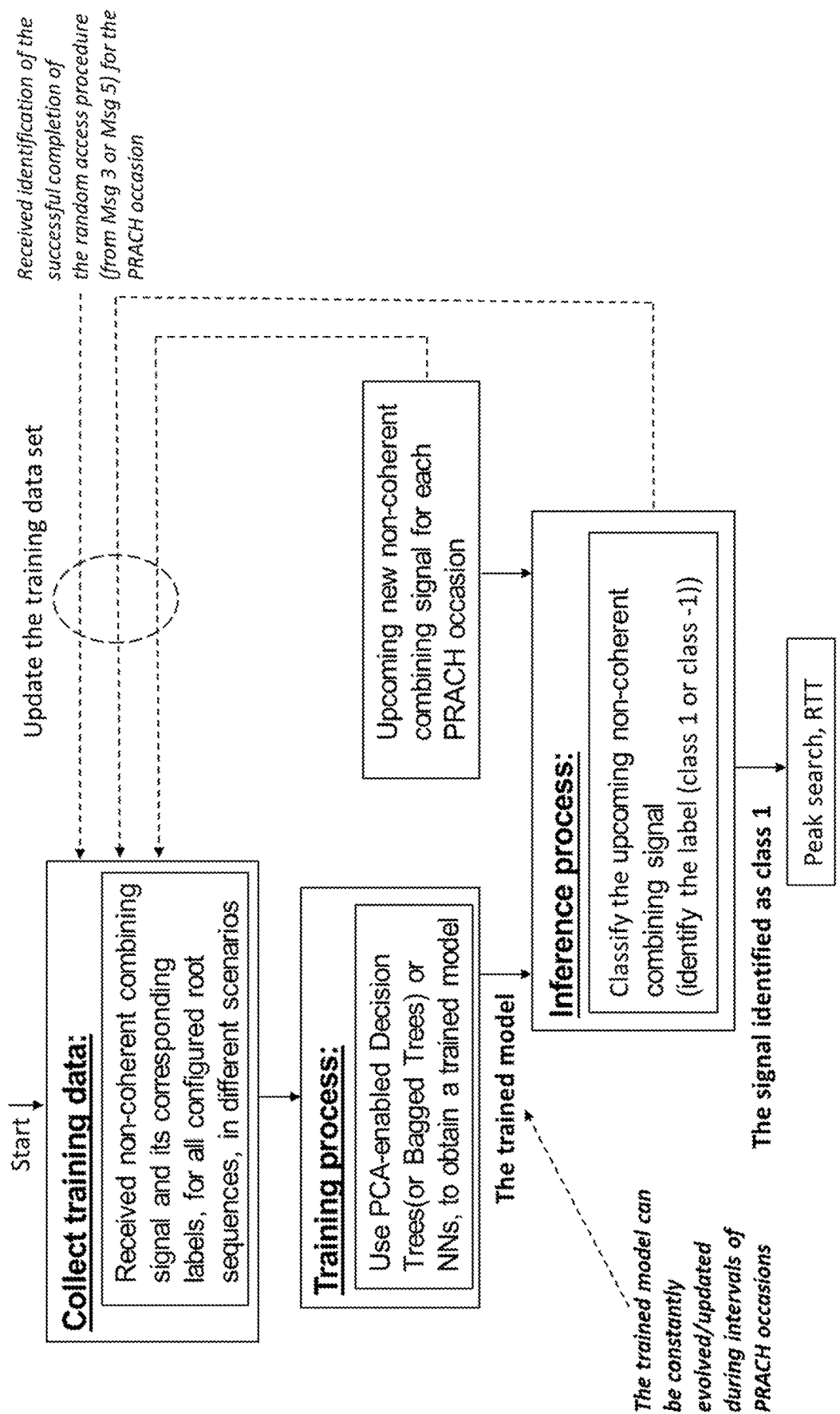
FIG. 16 is an exemplary flowchart from a perspective of the NN procedure.

FIG. 16 is an exemplary flowchart from a perspective of the NN procedure.

As shown in FIG. 16, following procedures may be associated to the NN.

Firstly, training data may be collected. Non-coherent combining signal and its corresponding labels (i.e., indication about whether associated to a sequence), for all configured root sequences, in different scenarios, may be received.

Then, in training process, the proposed PCA-enabled NN-based method may be used to train a ML model (PCA is used to reduce the dimensionality of input layer for NN).

Then, in inference process, the trained model may be used to make prediction or classification for the upcoming new signal for each PRACH occasion.

Finally, after prediction/classification, only the predicted/classified signal with label 1 (which means the one with peak value, possibly associated to a sequence) is fed to the following PRACH detection process.

The new signal and the corresponding detection result may be used to update the training data set, with help from the received identification of the successful completion of the random access procedure from the UE, such as Msg (message) 3 or Msg 5. And moreover, the trained model can be constantly updated during intervals of PRACH occasions.

Figure 17:
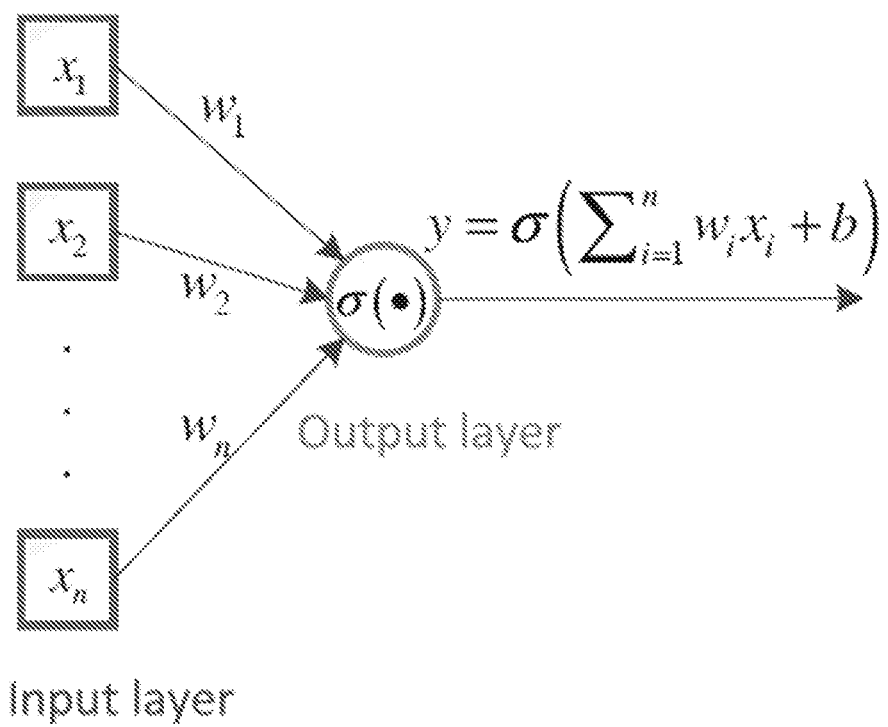
FIG. 17 is an exemplary diagram for a single neuron element in a neural network.

FIG. 17 is an exemplary diagram for a single neuron element in a neural network.

Neural Network (NN) is a class of machine learning frameworks. NN started from the single neuron. As shown in the FIG. 18, the inputs of the NN are $\{x_1, x_2, \ldots, x_n\}$ with the corresponding weights, $\{w_1, w_2, \ldots, w_n\}$. The neuron can be represented by a non-linear activation function, $\sigma(\cdot)$ that takes the sum of the weighted inputs. The output of the neuron can be expressed as $y=\sigma(\Sigma_{i=1}^{n} w_i x_i + b)$, where b is the bias or shift of the neuron.

Figure 18:
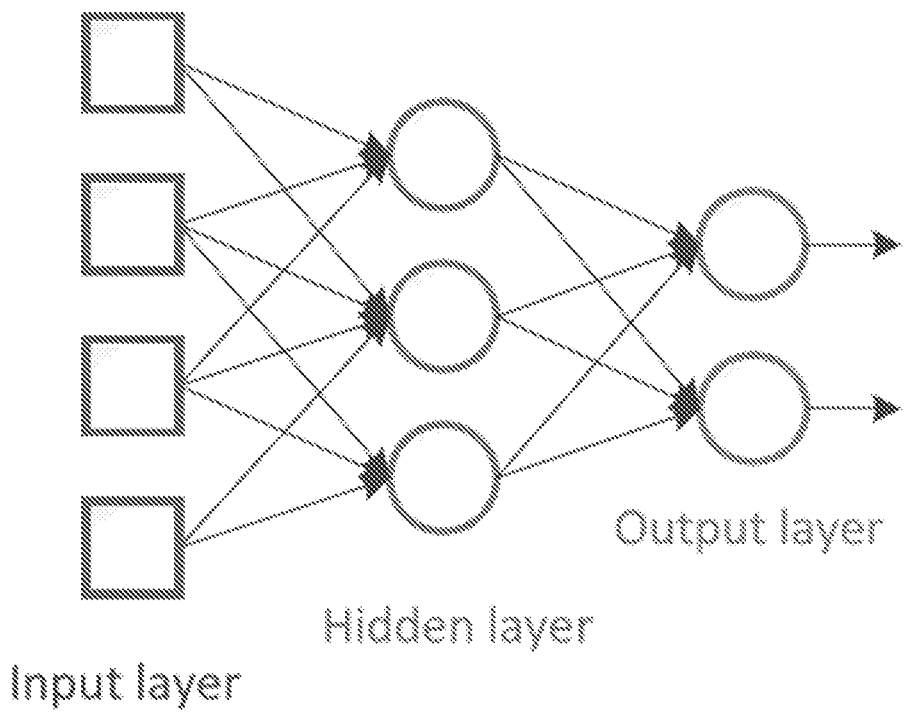
FIG. 18 is an exemplary diagram for a neural network.

FIG. 18 is an exemplary diagram for a neural network.

An NN can be established by connecting multiple neuron elements to generate multiple outputs to construct a layered architecture, such as including input layer, hidden layer, output layer, etc.

In the training process, the labelled data, that is, a set of input and output vector pairs, is used to adjust the weight set, W, by minimizing a loss function. In the NN with single neuron element, $W=\{b, w_1, w_2, \ldots, w_n\}$. The commonly-used loss functions include mean-squared error (MSE) and categorical cross-entropy. Stochastic gradient descent (SGD) is one of the most popular algorithms to optimize W. With the layered architecture, a NN includes multiple fully connected hidden layers, in which each of them represents a different feature of the input data.

In NNs, each neuron is connected to the adjacent layers while the neurons in the same layers are not connected to each other.

The weights and biases of a NN are usually learned based on the Stochastic Gradient Descent (SGD) with the gradients of the loss function back-propagated from the output layer to the input layer.

According to embodiments of the present disclosure, the PCA-enabled Neural Network (NN)-based ML method/module is proposed to select/classify the non-coherently combined signal with peak or no peak values. The proposed method can greatly improve the false alarm performance, and meanwhile maintain the missed detection performance.

In PRACH detection, by using the proposed PCA-enabled NN-based ML method, only the non-coherent combining output with predicted label 1 (i.e., with peak value) is needed to be used for the following peak search PRACH procedures, others with predicted label as −1 (i.e., with no peak value) are discarded.

Figure 19:
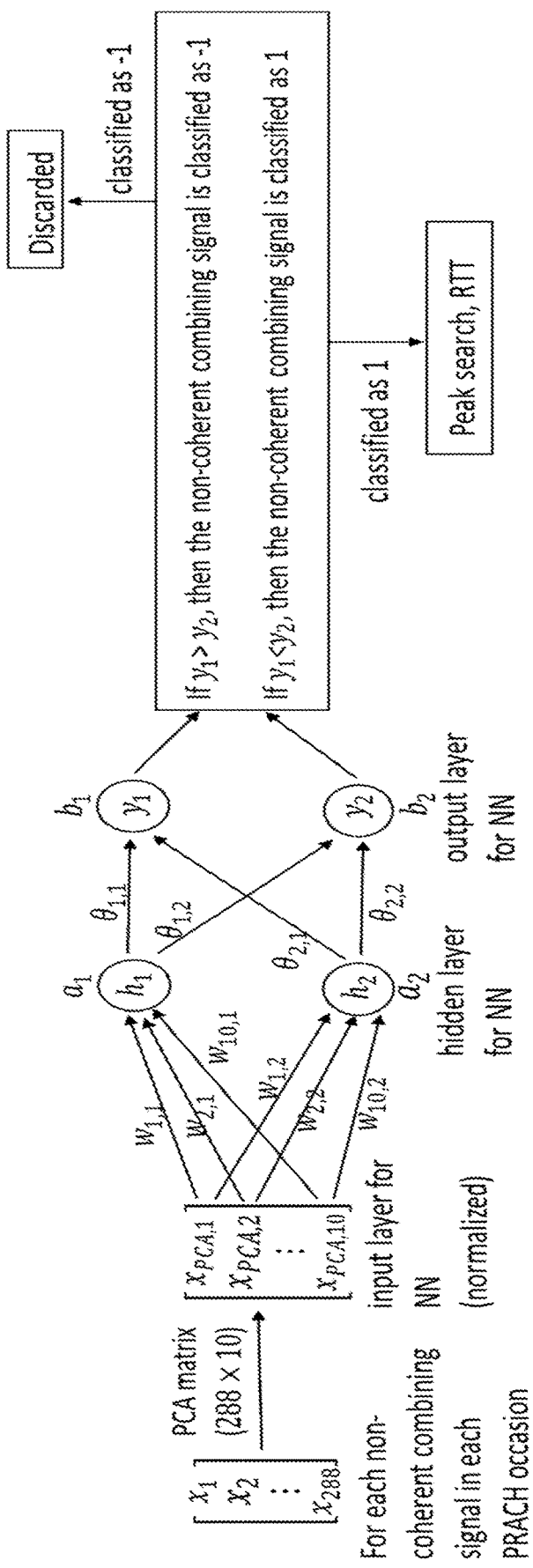
FIG. 19 is an exemplary diagram for PCA-enabled NN, according to embodiments of the present disclosure.

FIG. 19 is an exemplary diagram for PCA-enabled NN, according to embodiments of the present disclosure.

As shown in FIG. 19, an example of PCA (kept 10 components out of total 288 components of each non-coherent combining signal in each PRACH occasion) is included.

Some reference signs in FIG. 19 may be defined as follows:

$$h_1 = \text{sigmoid}(\Sigma_{i=1}^{10} x_{PCA,i} * w_{i,1} + a_1), h_2 = \text{sigmoid}(\Sigma_{i=1}^{10} x_{PCA,i} w_{i,2} + a_2),$$

$$y_1 = \text{Sigmoid}(\Sigma_{i=1}^{2} h_i * \theta_{i,1} + b_1), y_2 = \text{sigmoid}(\Sigma_{i=1}^{2} h_i * \theta_{i,2} + b_2), \text{sigmoid}(v) = 1./(1 + \exp(-v)),$$

$w_{i,j}$ and $a_i$ are the weights and biases for the hidden layer, $\theta_{i,j}$ and $b_i$ are the weights and biases for the output layer.

For each non-coherent combining signal in each PRACH occasion, it is multiplied by a PCA matrix to reduce its dimensionality from the current 288 to 10 (in order to reduce the following computational complexity), and then the trained weights and biases of the input layer is used to obtain the hidden layer (h_1 and h_2), and finally the trained weights and biases of the hidden layer is used to obtain the output layer (y_1 and y_2).

If $y_1 > y_2$, then the non-coherent combining signal is classified as −1 and discarded.

And If $y_1 < y_2$, then the non-coherent combining signal is classified as 1 and it will be used in the following PRACH detection procedures like peak search and RTT estimation.

Figure 20:
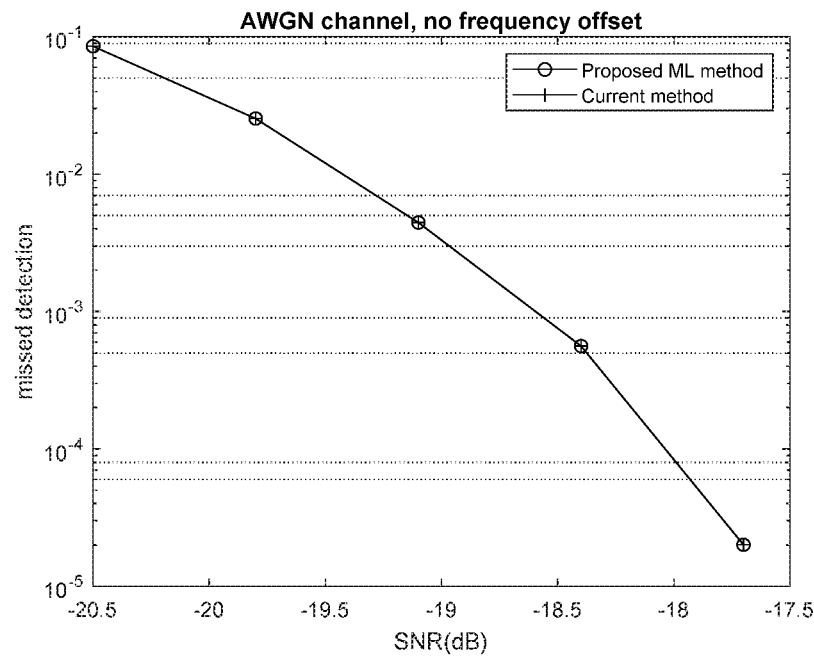
FIG. 20 is an exemplary diagram showing a missed detection performance in AWGN channel.
Figure 21:
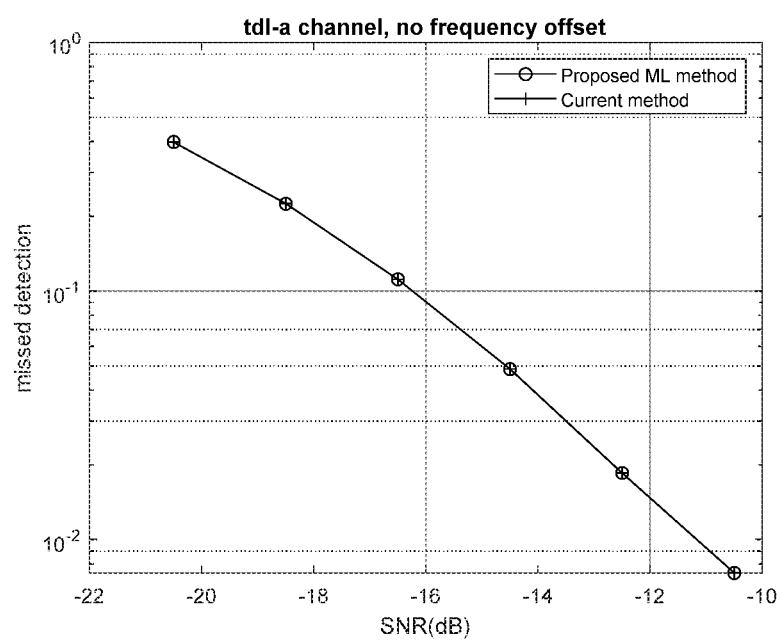
FIG. 21 is an exemplary diagram showing a missed detection performance in tdl-a channel.
Figure 22:
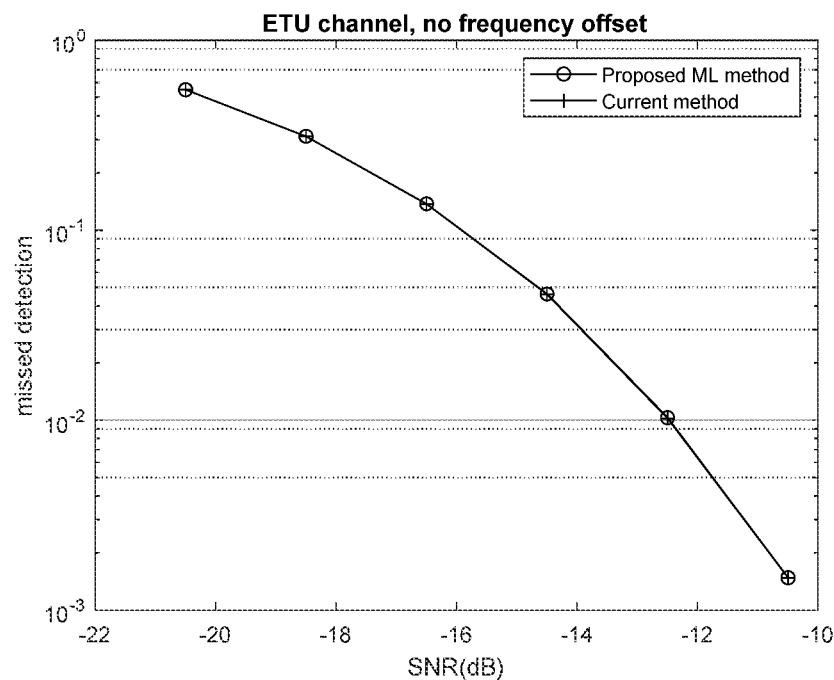
FIG. 22 is an exemplary diagram showing a missed detection performance in ETU channel.
Figure 23:
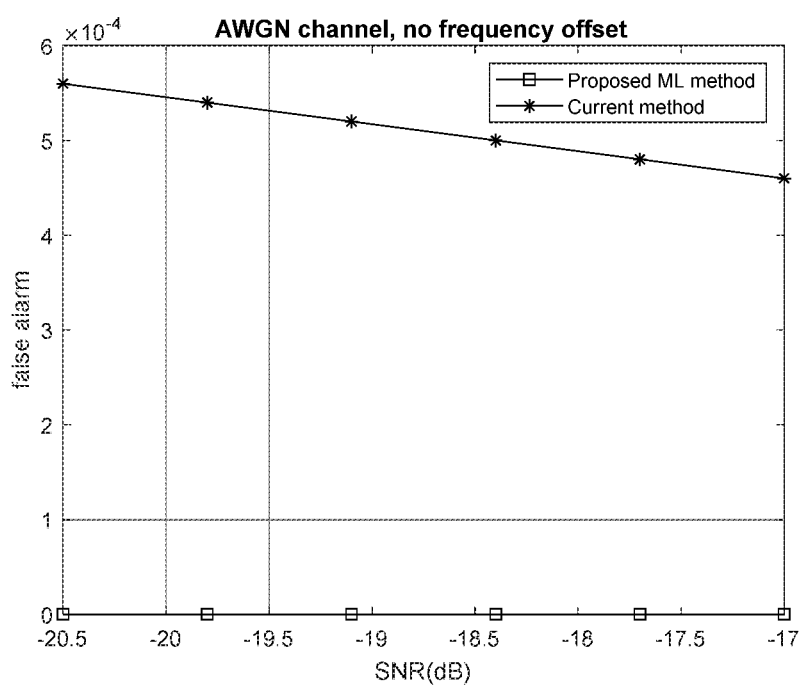
FIG. 23 is an exemplary diagram showing a false alarm performance in AWGN channel.
Figure 24:
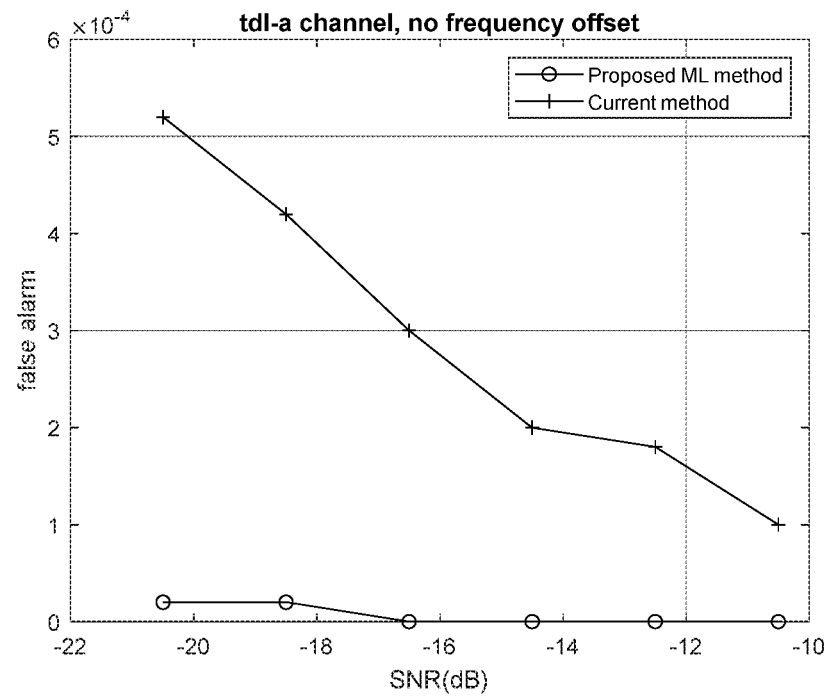
FIG. 24 is an exemplary diagram showing a false alarm performance in tdl-a channel.
Figure 25:
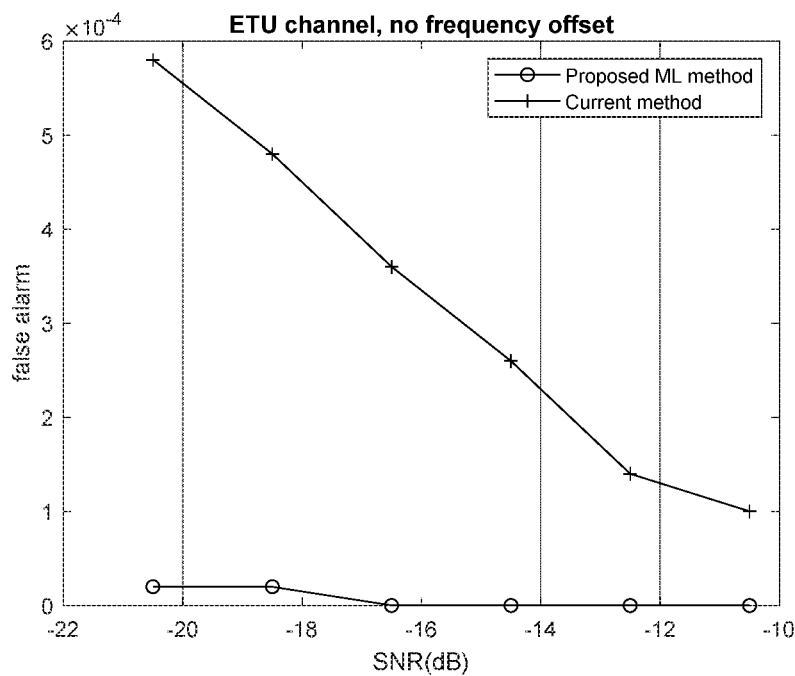
FIG. 25 is an exemplary diagram showing a false alarm performance in ETU channel.
Figure 26:
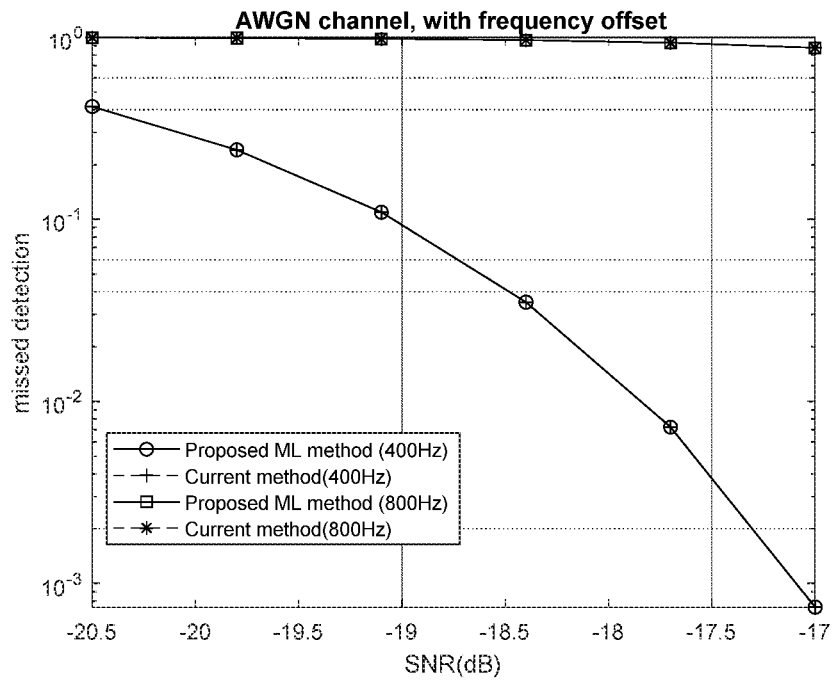
FIG. 26 is an exemplary diagram showing a missed detection performance in AWGN channel, with frequency offset.
Figure 27:
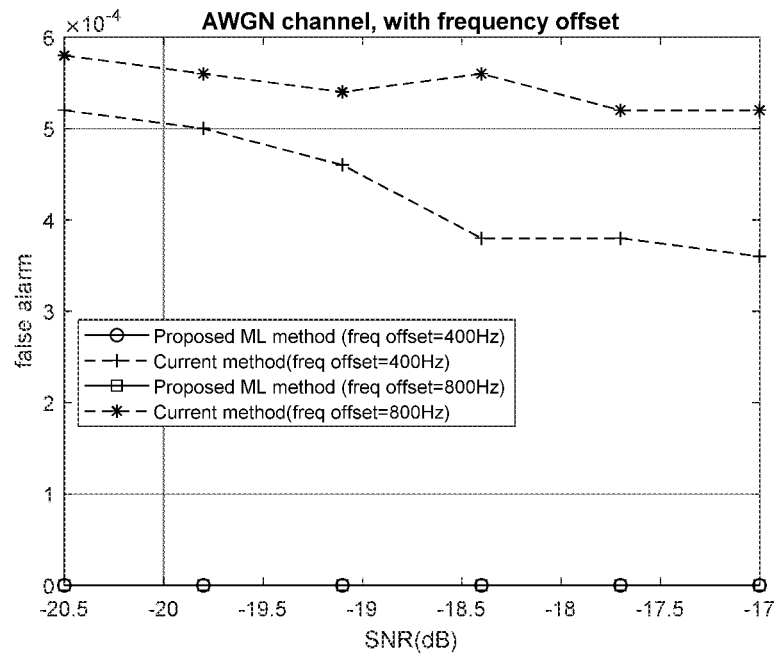
FIG. 27 is an exemplary diagram showing a false alarm performance in AWGN channel, with frequency offset.
Figure 28:
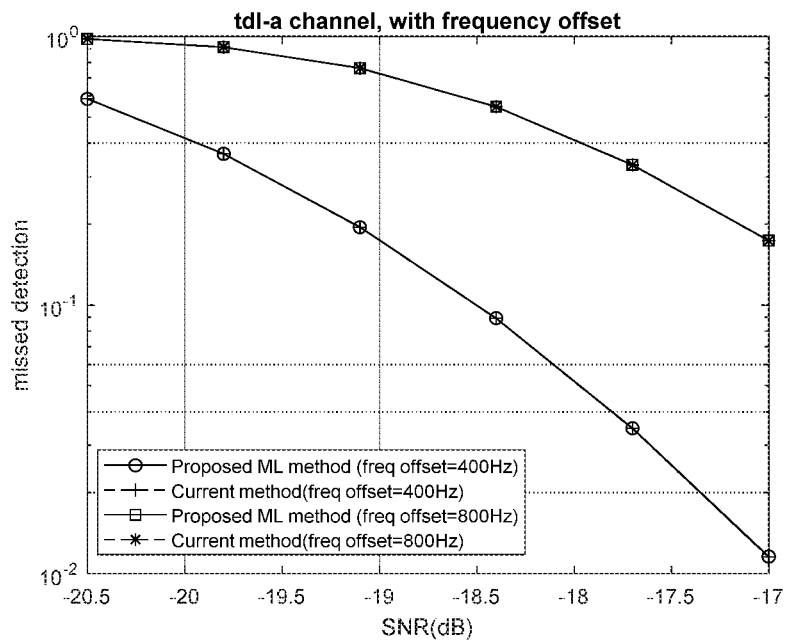
FIG. 28 is an exemplary diagram showing a missed detection performance in tdl-a channel, with frequency offset.
Figure 29:
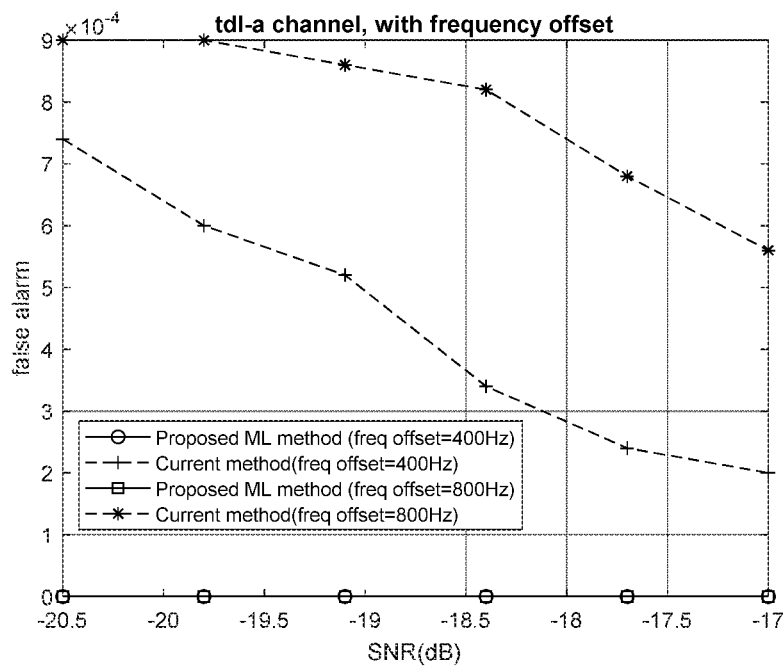
FIG. 29 is an exemplary diagram showing a false alarm performance in tdl-a channel, with frequency offset.
Figure 30:
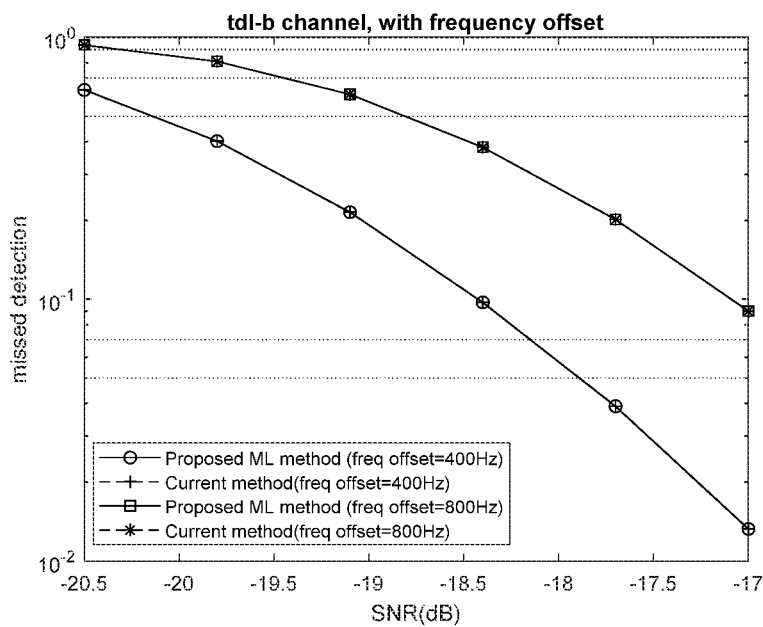
FIG. 30 is an exemplary diagram showing a missed detection performance in tdl-b channel, with frequency offset.
Figure 31:
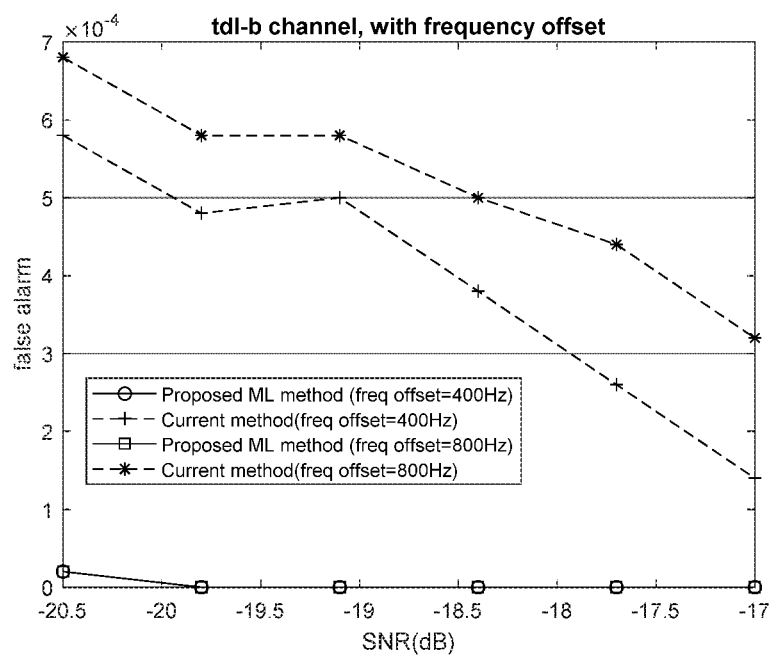
FIG. 31 is an exemplary diagram showing a false alarm performance in tdl-b channel, with frequency offset.
Figure 32:
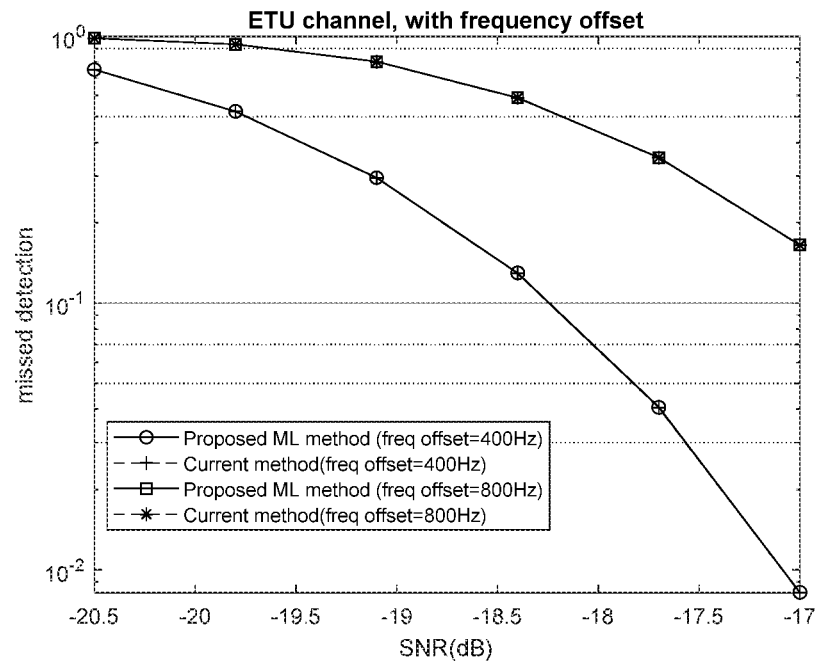
FIG. 32 is an exemplary diagram showing a missed detection performance in ETU channel, with frequency offset.
Figure 33:
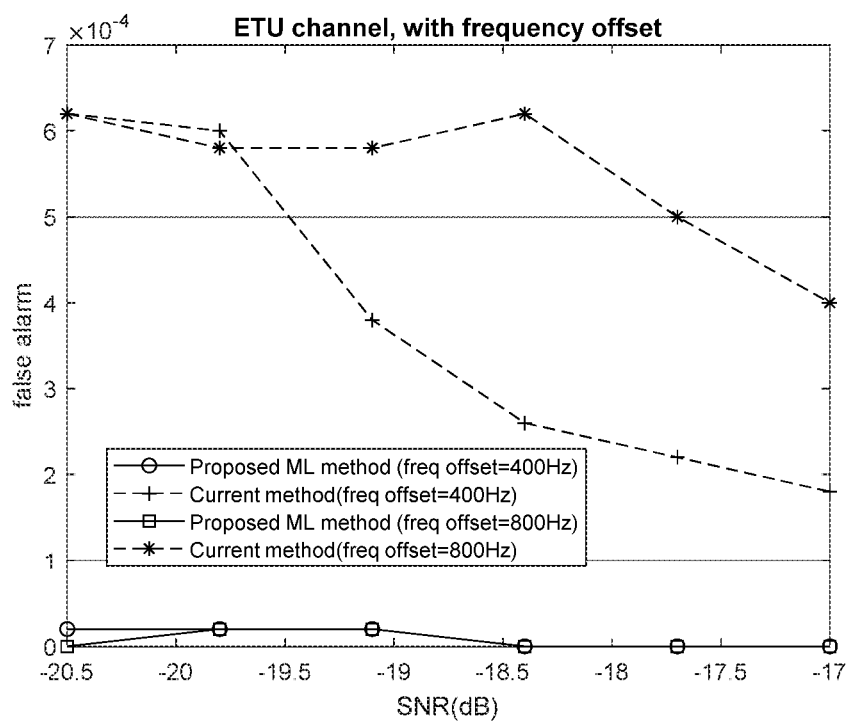
FIG. 33 is an exemplary diagram showing a false alarm performance in ETU channel, with frequency offset.

FIG. 20 is an exemplary diagram showing a missed detection performance in AWGN channel. FIG. 21 is an exemplary diagram showing a missed detection performance in tdl-a channel. FIG. 22 is an exemplary diagram showing a missed detection performance in ETU channel. FIG. 23 is an exemplary diagram showing a false alarm performance in AWGN channel. FIG. 24 is an exemplary diagram showing a false alarm performance in tdl-a channel. FIG. 25 is an exemplary diagram showing a false alarm performance in ETU channel. FIG. 26 is an exemplary diagram showing a missed detection performance in AWGN channel, with frequency offset. FIG. 27 is an exemplary diagram showing a false alarm performance in AWGN channel, with frequency offset. FIG. 28 is an exemplary diagram showing a missed detection performance in tdl-a channel, with frequency offset. FIG. 29 is an exemplary diagram showing a false alarm performance in tdl-a channel, with frequency offset. FIG. 30 is an exemplary diagram showing a missed detection performance in tdl-b channel, with frequency offset. FIG. 31 is an exemplary diagram showing a false alarm performance in tdl-b channel, with frequency offset. FIG. 32 is an exemplary diagram showing a missed detection performance in ETU channel, with frequency offset. FIG. 33 is an exemplary diagram showing a false alarm performance in ETU channel, with frequency offset.

As shown in FIG. 20-33, comparing with conducting peak search PRACH procedures for all configured root sequences, which correspond to all non-coherently combined signals, the proposed NN-based ML method has advantages compared to the current method (without ML). The simulation results in these figures may be obtained via a product-level simulator.

Particularly, as shown in FIG. 20-22, for missed detection performance, the proposed ML method is the same as the current method without ML, in the absence or in the presence of frequency offset.

As shown in FIG. 23-25, for false alarm performance, the proposed ML method is much better than the current method without ML. The proposed ML method has nearly zero false alarm performance, for all the simulated SNR values. By greatly improving the false alarm performance, resources (like spectrum and processing power, etc.) can be saved for both the gNB and UE, because the falsely triggered probability of at least Msg 2 (maybe include Msg 3 and 4) can be significantly reduced.

As shown in FIG. 26-33, the proposed ML method is robust against frequency offset. In the presence of frequency offset, as the frequency offset becomes larger, the missed detection performance becomes worse for both the proposed ML method and the current method. However, the false alarm performance of the proposed ML method is not affected by the frequency offset, whereas the false alarm performance of the current method degrades significantly as the frequency offset becomes larger.

For example, as shown in FIG. 27, in AWGN channel, for false alarm performance, the proposed ML method is much better than the current method without ML. The proposed ML method has zero false alarm performance, for all the simulated SNR values. This shows different result obtained in AWGN channel, where false alarm performance of the proposed ML method is always zero.

For another example, as shown in FIG. 29, etc, in tdl-a channel, for false alarm performance, the proposed ML method is much better than the current method without ML. The proposed ML method has nearly zero false alarm performance, for all the simulated SNR values.

Figure 34:
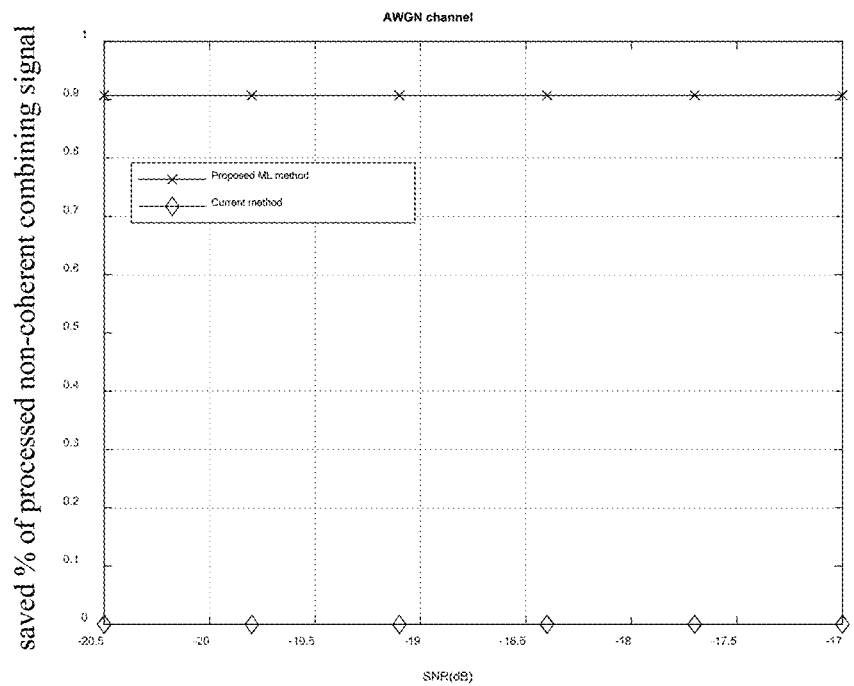
FIG. 34 is an exemplary diagram showing a saved percentage of processed non-coherent combining signal in AWGN channel.
Figure 35:
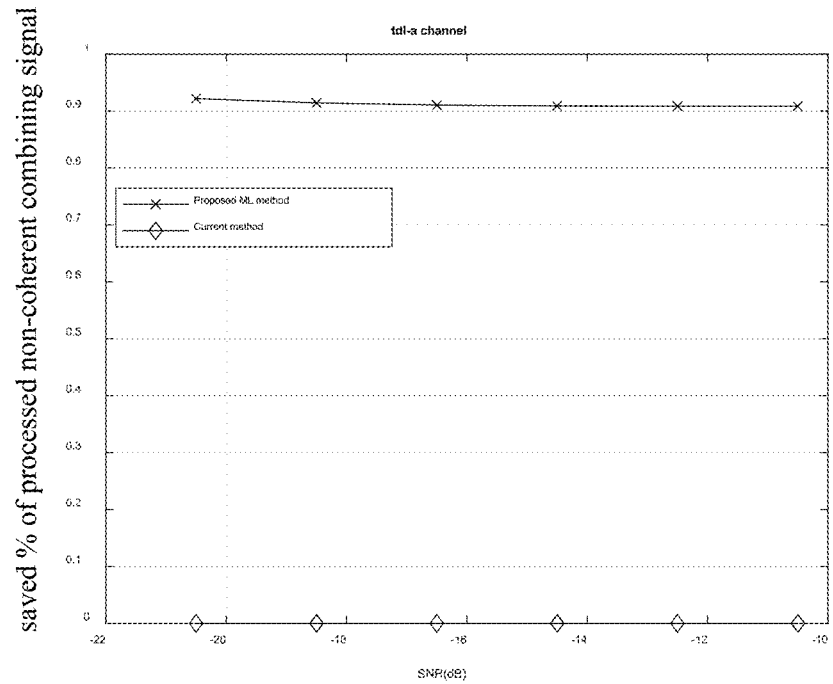
FIG. 35 is an exemplary diagram showing a saved percentage of processed non-coherent combining signal in tdl-a channel.
Figure 36:
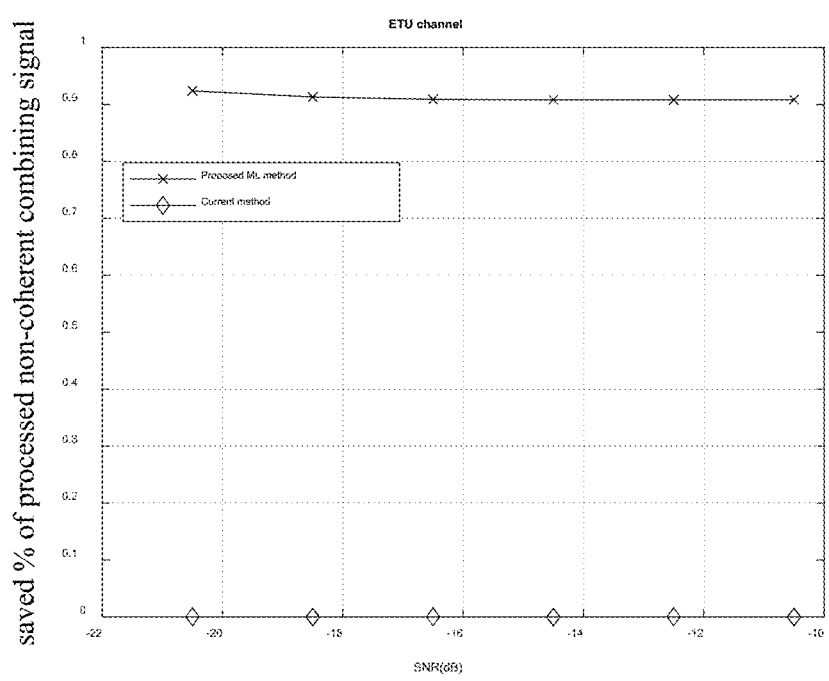
FIG. 36 is an exemplary diagram showing a saved percentage of processed non-coherent combining signal in ETU channel.

FIG. 34 is an exemplary diagram showing a saved percentage of processed non-coherent combining signal in AWGN channel. FIG. 35 is an exemplary diagram showing a saved percentage of processed non-coherent combining signal in tdl-a channel. FIG. 36 is an exemplary diagram showing a saved percentage of processed non-coherent combining signal in ETU channel.

As shown in FIG. 34-36, the proposed ML method can save about 90% of non-coherent combining signal which need to perform peak search and RTT estimation, etc. This translates into the following computational complexity reduction:

The proposed ML method will reduce complexity in Round, Comparison and Mod operations. Only 10%, 10.31% and 10% of the complexity in the current method is needed, in Round, Comparison and Mod operations, respectively.

For example, the base line is the current method without ML, where there is no saved percentage of processed non-coherent combining signal (in the simulation, 5000*10*11=550000 non-coherent combining signal needs to be processed).

However, for the proposed ML method, only about 550000*(1-90%)=55000 non-coherent combining signal which are classified as class 1 needs to perform peak search and RTT estimation, etc., and the other 500000 non-coherent combining signal which are classified as class −1 are discarded.

The computational complexity comparison between the proposed NN-based ML method and the current method without ML is listed below:

| Operation | The proposed ML method | The current method | Comparison |
|---|---|---|---|
| Multiplication operation | 11*580 + (1 − 0.9)*927 + 44 | 927 | 7 times more than the current method |
| Addition operation | 11*578 + (1 − 0.9)*862 + 44 | 862 | 8 times more than the current method |
| Round operation | (1 − 0.9)*264 | 264 | Only 10% of the current method |
| Mod operation | (1 − 0.9)*264 | 264 | Only 10% the current method |
| Comparison operation | 11*1 + (1 − 0.9)*3564 | 3564 | Only 10.31% of the current method |
| Exp operation | 44 | N/A | |

The complexity of the proposed ML method includes its inference process and its saved complexity compared to the current method.

The proposed ML method only involves Multiplication, Addition, Comparison and Exp operations.

The current method involves many types of operation: Multiplication, Addition, Comparison, Round and Mod operations.

The proposed ML method will add additional complexity in Multiplication and Addition operations.

There will be 7 times and 8 times more complexity in Multiplication and Addition, compared to the original method.

The proposed ML method will reduce complexity in Round, Comparison and Mod operations.

Only 10%, 10.31% and 10% of the complexity in the current method is needed, in Round, Comparison and Mod operations, respectively.

According to embodiments of the present disclosure, particularly in PRACH detection, by using the proposed NN-based ML method, we only need to use the non-coherent combining output with predicted label 1 (i.e., with predicted peak value) to the following peak search PRACH procedures, others with predicted label as −1 (i.e., with predicted no peak value) are discarded and not processed.

In the current existing method, we need to conduct peak search PRACH procedures for all configured root sequences.

For missed detection performance, the proposed ML method is the same as the current method without ML. This shows that with a well-trained NN model, the proposed ML method can perfectly select out the non-coherent combining signal with peak value.

For false alarm performance, the proposed ML method is much better than the current method without ML. The reason for the improved false alarm performance is that by using the proposed ML method, the gNB doesn't need to process the predicted non-coherent combining signal with no peak value (noise like signal), which may cause the false alarm.

About 90% of the overall non-coherent combining signal are predicted as with no peak value and are not processed (discarded), and this improves the false alarm performance.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

| Abbreviation | Explanation |
| --- | --- |
| UE | User Equipment/End |
| LTE | Long term evolution |
| DL | Downlink |
| UL | Uplink |
| 5G | 5th generation of radio network |
| BS | Base Station |
| DMRS | Demodulation Reference Signal |
| ETU | Extended Typical Urban |
| NN | Neural Network |
| ML | Machine Learning |
| PRACH | Physical Random Access Channel |
| RTT | Round Trip Time |
| SNR | Signal-to-Noise-Ratio |
| AWGN | Additive White Gaussian Noise |
| PCA | Principal Component Analysis |
| ZC | Zadoff-Chu |
| PreambleID | Preamble Identity |

The invention claimed is:

1. A method performed by a reception apparatus, comprising:
obtaining time domain samples of a radio signal;
processing the time domain samples by a plurality of match filters respectively, to generate a plurality of filtered results of the time domain samples, wherein the plurality of match filters corresponds to a plurality of respective code sequences;
classifying a filtered result of the plurality of filtered results by a classifier, wherein a classifying result indicates the filtered result as being associated to a code sequence in the plurality of code sequences or as not being associated to the code sequence in the plurality of code sequences;
discarding a filtered result classified as not being associated to the code sequence; and
determining whether the code sequence is used in the radio signal when a filtered result of the radio signal is classified as being associated to the code sequence.

2. The method of claim 1, further comprising:
processing a filtered result classified as being associated to the code sequence, by peak search for the code sequence;
wherein whether the code sequence is used in the radio signal is determined, based at least on a result of the peak search.

3. The method of claim 1, wherein the classifier comprises a machine learning (ML) classifier.

4. The method of claim 3, wherein the ML classifier comprises a neural network (NN) classifier.

5. The method of claim 1, further comprising:
processing each filtered result of the plurality of filtered results by non-coherent combining, before classifying.

6. The method of claim 5,
wherein each filtered result comprises data from a plurality of reception antennas; and
wherein the data from the plurality of reception antennas is non-coherently combined during the non-coherent combining.

7. The method of claim 6,
wherein data from a reception antenna of the plurality of reception antennas comprises a complex vector or matrix; and
wherein a plurality of complex vectors or matrices corresponding to the plurality of reception antennas of a filtered result is non-coherently combined to a real vector or matrix, during the non-coherent combining.

8. The method of claim 7, wherein the real matrix is classified, during classifying.

9. The method of claim 8, wherein a dimensionality reduction for the real vector or matrix is performed during classifying.

10. The method of claim 9, wherein the dimensionality reduction comprises a principal component analysis (PCA).

11. The method of claim 1, further comprising:
processing the time domain samples by fast Fourier transform (FFT) before the plurality of match filters; and
processing the plurality of filtered results by inverse fast Fourier transform (IFFT), after the plurality of match filters.

12. The method of claim 1, further comprising:
processing the time domain samples by pre-whitening, before the plurality of match filters.

13. The method of claim 1, further comprising:
calculating a round trip time (RTT) relating to the radio signal, when the code sequence is determined to be used in the radio signal.

14. The method of claim 1, wherein the reception apparatus comprises a base station.

15. The method of claim 1, wherein the plurality of code sequences is configured root sequences for a physical random access channel (PRACH).

16. A reception apparatus, comprising:
a processor; and a memory, the memory containing instructions executable by the processor, whereby the reception apparatus is configured to:

obtain time domain samples of a radio signal;

process the time domain samples by a plurality of match filters respectively, to generate a plurality of filtered results of the time domain samples, wherein the plurality of the match filter corresponds to a plurality of respective code sequences;

classify a filtered result of the plurality of filtered results by a classifier, wherein a classifying result indicates the filtered result as being associated to a code sequence in the plurality of code sequences or as not being associated to the code sequence in the plurality of code sequences;

discard a filtered result classified as not being associated to the code sequence; and determine whether the code sequence is used in the radio signal when a filtered result of the radio signal is classified as being associated to the code sequence.

17. The reception apparatus of claim 16, wherein the reception apparatus is further configured to process a filtered result classified as being associated to the code sequence by peak search for the code sequence, wherein whether the code sequence is used in the radio signal is determined based at least on a result of the peak search.

18. The reception apparatus of claim 16, wherein the classifier comprises a machine learning (ML) classifier.

19. The reception apparatus of claim 16, wherein the reception apparatus is further configured to process each filtered result of the plurality of filtered results by non-coherent combining, before classifying.

* * * * *